United States Patent [19]

Aono et al.

[11] Patent Number: 5,005,186

[45] Date of Patent: Apr. 2, 1991

[54] DIGITAL DEMODULATOR APPARATUS

[75] Inventors: Yoshihito Aono, Tochigi; Takanori Iwamatsu, Otawara; Morihiko Minowa, Machida; Sadao Takenaka; Yoshimasa Daidoh, both of Yokohama; Hiroshi Nakamura, Sagamihara; Nobutsugu Fujino, Kawasaki, all of Japan

[73] Assignee: Fujitsu Limited, Kawasaki, Japan

[21] Appl. No.: 265,459

[22] PCT Filed: Mar. 17, 1988

[86] PCT No.: PCT/JP88/00280

§ 371 Date: Oct. 13, 1988

§ 102(e) Date: Oct. 13, 1988

[87] PCT Pub. No.: WO88/07302

PCT Pub. Date: Sep. 22, 1988

[30] Foreign Application Priority Data

Mar. 20, 1987 [JP] Japan ................. 62-064145
Mar. 20, 1987 [JP] Japan ................. 62-064147
Jun. 17, 1987 [JP] Japan ................. 62-149267
Jul. 11, 1987 [JP] Japan ................. 62-172111

[51] Int. Cl.$^5$ ................. H04L 27/06; H04L 5/12
[52] U.S. Cl. ................. 375/82; 375/39; 329/304
[58] Field of Search ................. 375/94, 96, 95, 39, 375/98, 15, 76, 80, 82; 329/304, 310; 371/37, 38, 43; 455/60

[56] References Cited

U.S. PATENT DOCUMENTS

| 4,581,601 | 4/1986 | Calderbank et al. | 375/94 X |
| 4,683,578 | 7/1987 | Betts et al. | 375/39 X |
| 4,821,290 | 4/1989 | Hingorani et al. | 375/94 X |
| 4,827,489 | 5/1989 | Doi et al. | 375/94 |
| 4,860,316 | 8/1989 | Takenaka et al. | 375/39 |
| 4,864,244 | 9/1989 | Sasaki | 329/304 |
| 4,905,255 | 2/1990 | Aalaei | 375/76 X |

OTHER PUBLICATIONS

IEEE Transactions on Communicatons, vol. COM-30, No. 10, Oct. 1982, IEEE (New York, US), Y. Matsuo et al.

IEEE Transactions on Communications, vol. COM-21, No. 10, Oct. 1973, IEEE (New York, US), M. K. Simon et al.

Primary Examiner—Benedict V. Safourek
Assistant Examiner—Ralph Smith
Attorney, Agent, or Firm—Staas & Halsey

[57] ABSTRACT

A digital demodulation apparatus which has a detector (11) for receiving transmission signals ($S_{in}$) modulated under a multivalue quadrature amplitude modulation method in accordance with a honeycomb signal structure point arrangement. The detector produces I channel and Q channel demodulation signals. The apparatus also includes a discriminator (13) which converts the analog demodulation signals (Sa) to digital demodulation signals (Sd), a memory (21) which successively receives said digital demodulation signals (Sd) and reproduces corresponding original data. The read only memory (21) stores data representatives of the honeycomb signal structure point arrangement, and stores polarity bits (P) and error bits ($\epsilon$) of the signal points.

18 Claims, 33 Drawing Sheets

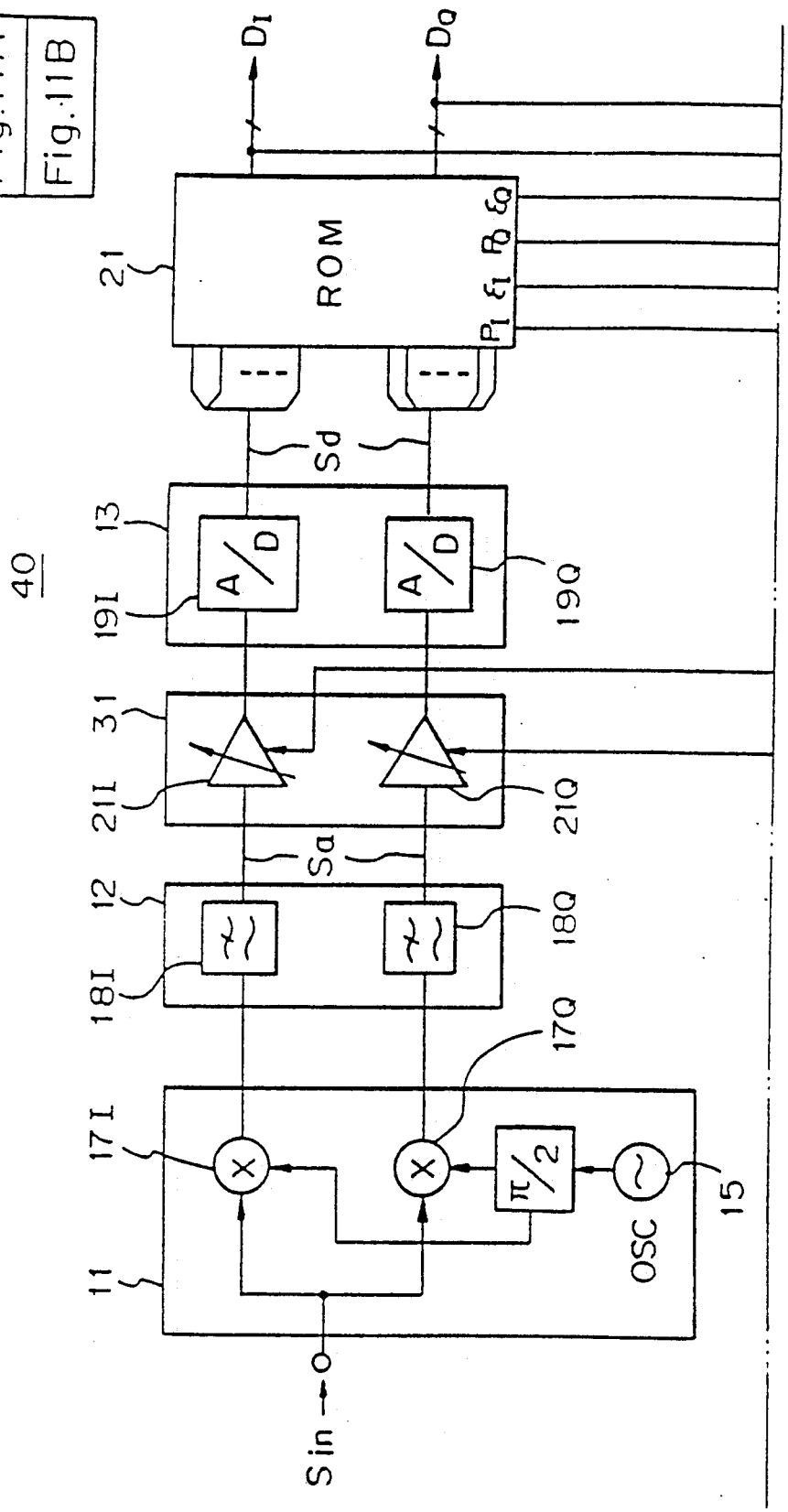

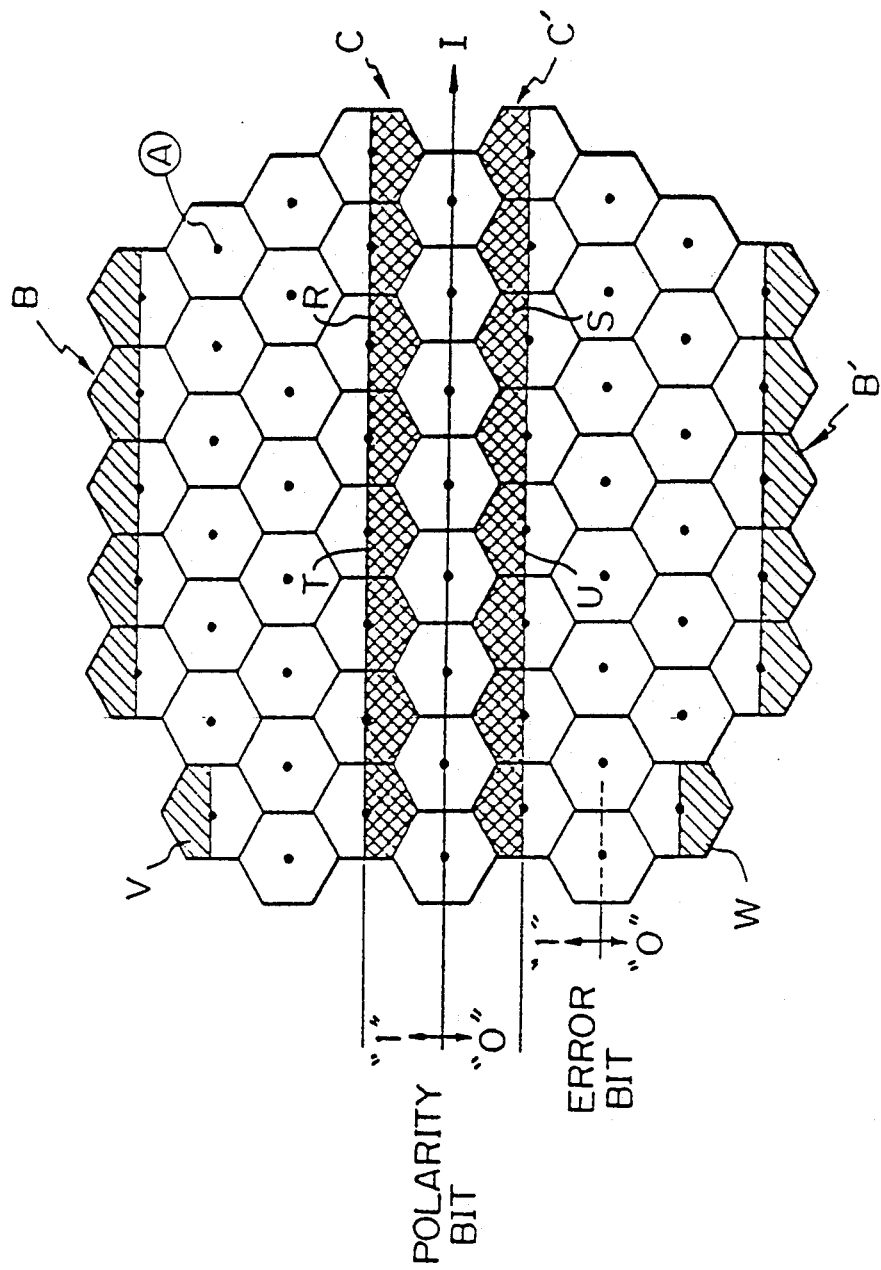

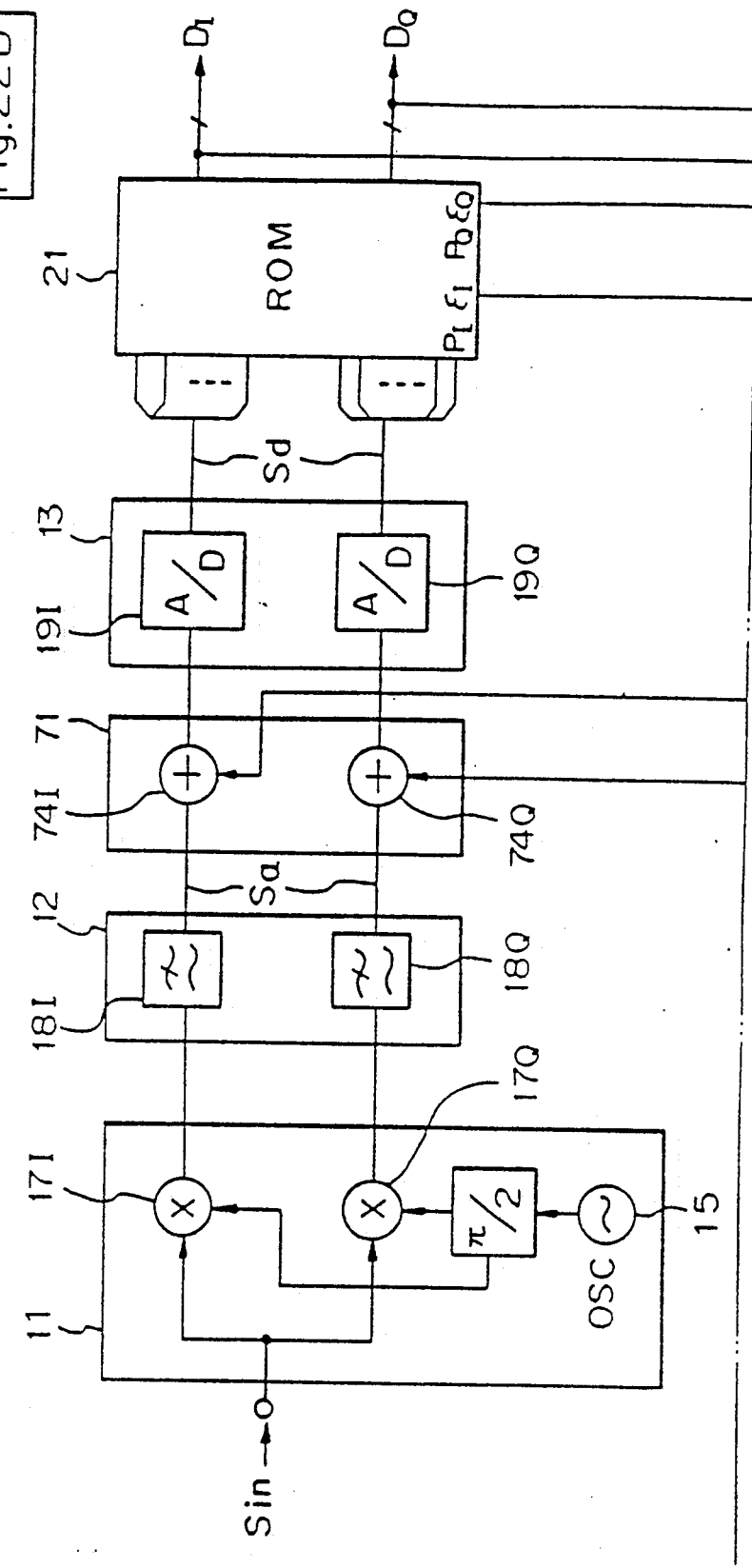

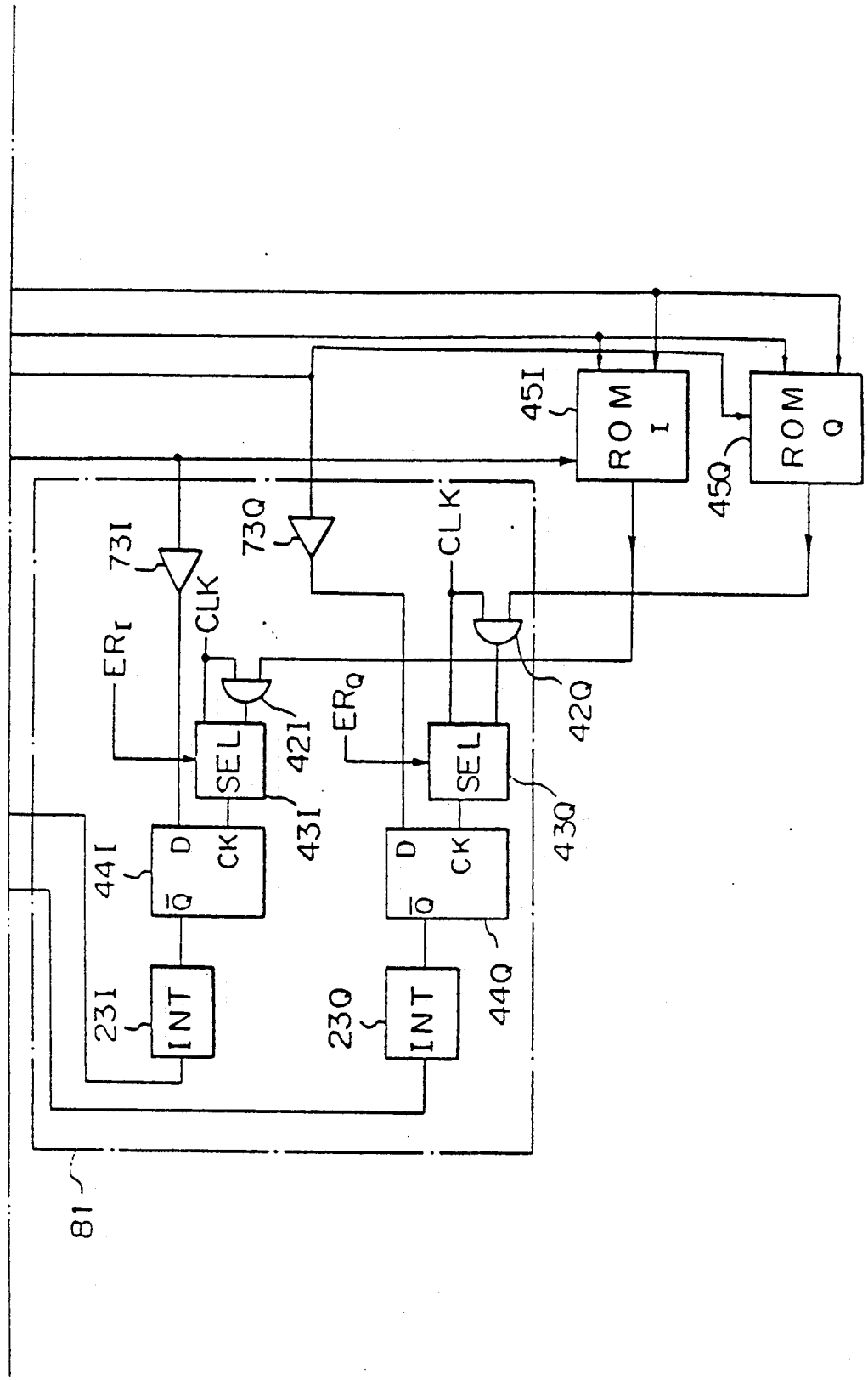

Fig. 38

| INPUT | | | | OUTPUT |
|---|---|---|---|---|
| COLUMN NUMBER | ROW NUMBER | RIGHT UP | RIGHT DOWN | |
| | ⋮ | | | ⋮ |
| 5 | 4 | — | — | 27 |
| | 5 | 0 | — | 27 |
| | | 1 | — | 10 |
| | 6 | — | — | 10 |
| | 7 | — | 0 | 10 |
| | | — | 1 | 14 |
| | 8 | — | — | 14 |
| | ⋮ | | | |
| | ⋮ | | | |
| 6 | 4 | — | — | 27 |
| | 5 | — | 0 | 27 |
| | | — | 1 | 26 |
| | 6 | — | — | 26 |
| | 7 | 0 | — | 26 |
| | | 1 | — | 14 |
| | 8 | — | — | 14 |
| | ⋮ | | | |

DIGITAL DEMODULATOR APPARATUS

TECHNICAL FIELD

The present invention is related to a digital demodulator apparatus, more particularly to a demodulator apparatus which receives transmission signals modulated by the multivalue quadrature amplitude modulation method, having a honeycomb structure signal point arrangement, and reproduces the original code data.

Digitalization by the modulation method is effective for improving the efficiency of frequency utilization, a fundamental point in radio systems. Therefore, use has been made of the QAM (quadrature amplitude modification) system, which enables digitalization relatively easily. As to the modulation level, there tendency is to use of multivalues from 4-value to 16-value and 16-value to 64-value and further 256-value.

However, the use of multivalues has been accompanied by a remarkable increase in the transmission power for ensuring the necessary signal reception level. Further, this increase in the transmission power causes interference with neighboring transmission lines and new problems in the area of ensurement of power at the radio offices.

FIG. 1 shows the signal point arrangement of a general QAM system, wherein the horizontal axis shows the I (In-phase) channel and the vertical axis the Q (Quadrature phase) channel. Note that in this figure, an example is shown of 64 value QAM. The signal points include three bits of the I channel ($2^3=8$ level) and three bits of the Q channel ($2^3=8$ level), for a total of 64 ($=8\times8$). As shown in the figure, the general QAM system is a so-called orthogonal grid structure.

To reduce the transmission power with a modulation system having a signal point arrangement having such an orthogonal grid structure, at least two conditions are necessary (1) the ratio of the average power (power required in the case where 64 values occur at the same probability as random occurrence) to the signal point pitch be made smaller and (2) the ratio of the average power and the peak power (generated at four corners of square signal point arrangement) be made smaller. The honeycomb structure has been proposed with this concept in mind.

FIG. 2 shows a signal point arrangement in a modulation system having a honeycomb structure. The horizontal axis and vertical axis have the same meanings as in FIG. 1. Further, there are also 64 signal points. With such a honeycomb structure, the distance between neighbouring signal points becomes completely the same and the conditions of the above-mentioned (1) are satisfied. Further, the outer periphery of the honeycomb structure becomes close to that of a circle (in the figure, a hexagon), so the above-mentioned condition (2) is satisfied. As shown, the honeycomb structure is an effective means for suppressing the increase in the transmission power along with conversion to multivalues.

FIG. 3 shows the basic construction of a digital demodulation apparatus of the present invention. The digital demodulation apparatus 10 is provided with a detector 11 which receives the transmission signal $S_{in}$ modulated by the multivalue QAM method with a honeycomb structure signal point arrangement and performs quadrature detection, a filter 12 which performs wave reshaping on the output, and a discrimination 13 which produces a digital demodulation signal by A/D conversion of the output. Further, it is provided with a code decision unit which decodes and reproduces the honeycomb structure modulated signal and, using the same, reproduces the original code data $D_I$ and $D_Q$.

With the above-mentioned QAM method, on the demodulation side the digital demodulation signal output from the discriminator, which comprises the A/D converter, matches the orthogonal grid structure signal point arrangement as it is, so the hardware for reproducing the code data, that is, the code decision unit (14 in FIG. 3), is extremely simple in construction.

With a modulation method with a honeycomb structure signal point arrangement, however, the original code data cannot be reproduced without passing the digital demodulation signal from the A/D converter through a special code decision unit. At the present point of time, however, no suitable means has been proposed for realizing this simply and cheaply and there is a problem in that a honeycomb method data transmission and reception system cannot be easily realized.

DISCLOSURE OF THE INVENTION

The present invention has as its object the provision of a practical digital demodulation apparatus which realizes simply and inexpensively the above-mentioned special code decision unit.

The present invention, to achieve the above-mentioned object, has the code decision unit comprised of a memory, preferably read only memory (ROM), which memory stores code data mapped in advance in the same way as the afore-mentioned honeycomb structure signal point arrangement and which memory stores also the polarity bit and error bit of the code data.

BRIEF DESCRIPTION OF THE DRAWINGS

The present invention will be further described in connection with its, embodiments, with reference being made to the accompanying drawings, wherein:

FIGS. 11A and 11B are circuit diagrams showing a modification of the digital demodulation apparatus of FIG. 10, FIG. 12 shows the gain control for a Q channel in a honeycomb type signal point arrangement, FIGS. 22A and 22B are circuit diagrams showing a modification of a digital demodulation apparatus of FIG. 21, FIG. 38 is an explanatory view showing an example of the method for final decision at the signal decision memory 136.

DESCRIPTION OF THE PREFERRED EMBODIMENTS

Figure 4:
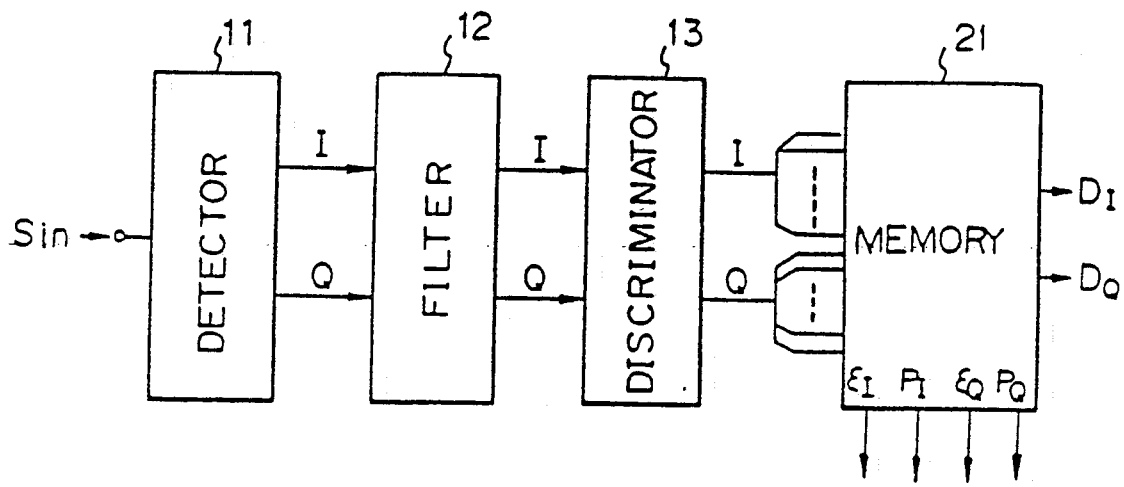
FIG. 4 is a block diagram showing the principle construction of a digital demodulation apparatus of the present invention.

FIG. 4 is a block diagram showing the principle construction of a digital demodulation apparatus of the present invention.

Figure 1:
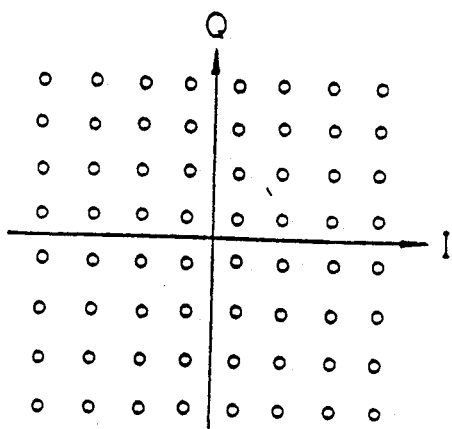
FIG. 1 shows the signal point arrangement of a general QAM method.
Figure 2:
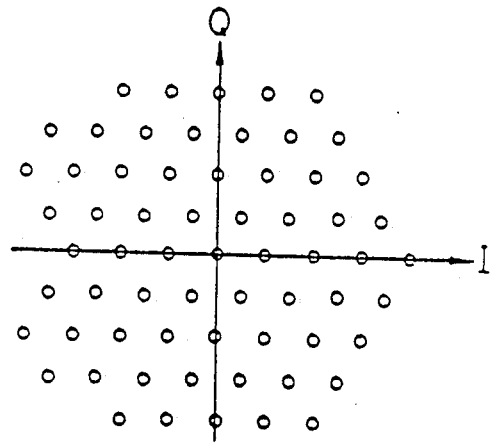
FIG. 2 shows the signal point arrangement in a modulation method having a honeycomb structure.
Figure 3:
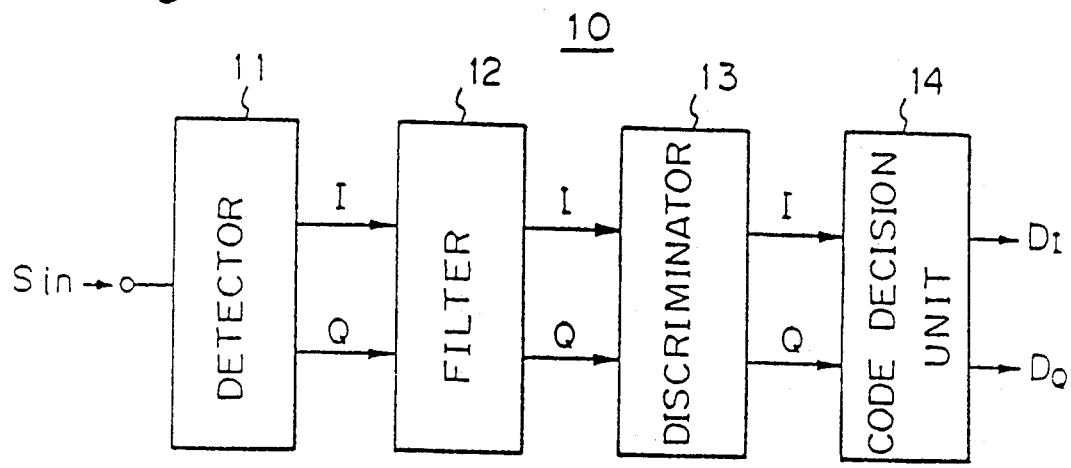
FIG. 3 shows the basic construction of a digital demodulation apparatus of the present invention.

The digital demodulation apparatus 20 of the present invention can be realized practically by the code decision unit 14 of FIG. 3 and, as illustrated, is comprised by a memory (ROM or RAM) 21, preferably by ROM.

Figure 5:
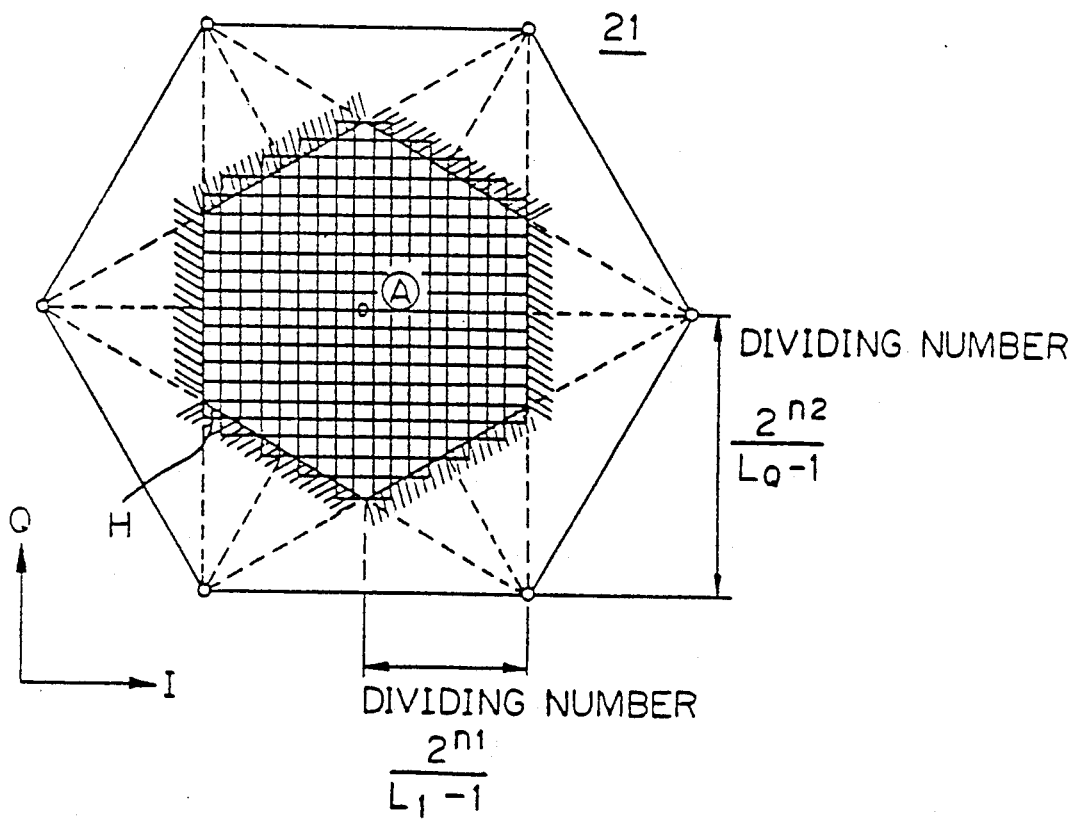
FIG. 5 shows the mapping in a ROM for a single signal point.

FIG. 5 shows the mapping in a ROM for a single signal point. The signal point is shown by the small circle Ⓐ in the center. The digital demodulation signal entering the area inside of the lightly hatched hexagon H are all allocated to signal point Ⓐ (code data Ⓐ. In a honeycomb structure, the signal point Ⓐ is at a equal distance with respect to all neighboring signal points (in the figure, the small- circles at the corners of the outermost hexagon). It the discrimination threshold (hexagon H) of the signal point Ⓐ is one-half of this distance, the maximum discrimination margin is obtained, error rate becomes small. However, since a discrimination threshold slanted with respect to the I axis and Q axis is included, code decision becomes difficult. To eliminate this difficulty, in the present invention, the ROM 21 is introduced. Further, the number of bits of the ROM 21 are increased to facilitate providing the error bits $\epsilon_I$ and $\epsilon_Q$ that are indispensible for usual pseudo error detection, from the ROM 21. In FIG. 5, to provide the error bits, the hexagon H is further subdivided (shown by group of small squares}. The dividing number is $2^{n1}/L_I-1$ in the interval shown in the I axial direction and $2^{n2}/L_Q-1$ in the interval shown in the Q axial direction. Here, n1 is the number of bits of the I channel output of the discriminator 13 (FIG. 4), n2 is the number of bits of the Q channel output of the discriminator 13, LI is the number of signal point levels seen on the I axis, and $L_Q$ is the number of signal point levels seen on the Q axis.

The ROM 21 also outputs the polarity bits $P_I$ and $P_Q$, which are indispensible for decision of the data. With a general QAM method, as shown in the later mentioned FIG. 9, the polarity bits are simply determined in accordance with whether the signal point is above or below the level $S_1$. However, with the honeycomb structure signal point arrangement, for example FIG. 13, the polarity bits cannot be simply determined. That is, until the coordinates of the signal points are determined for the I channel and Q channel, the polarity bits cannot be obtained.

Therefore, it is decided to read out the polarity bits $P_I$ and $P_Q$ from the ROM 21 too.

Figure 6:
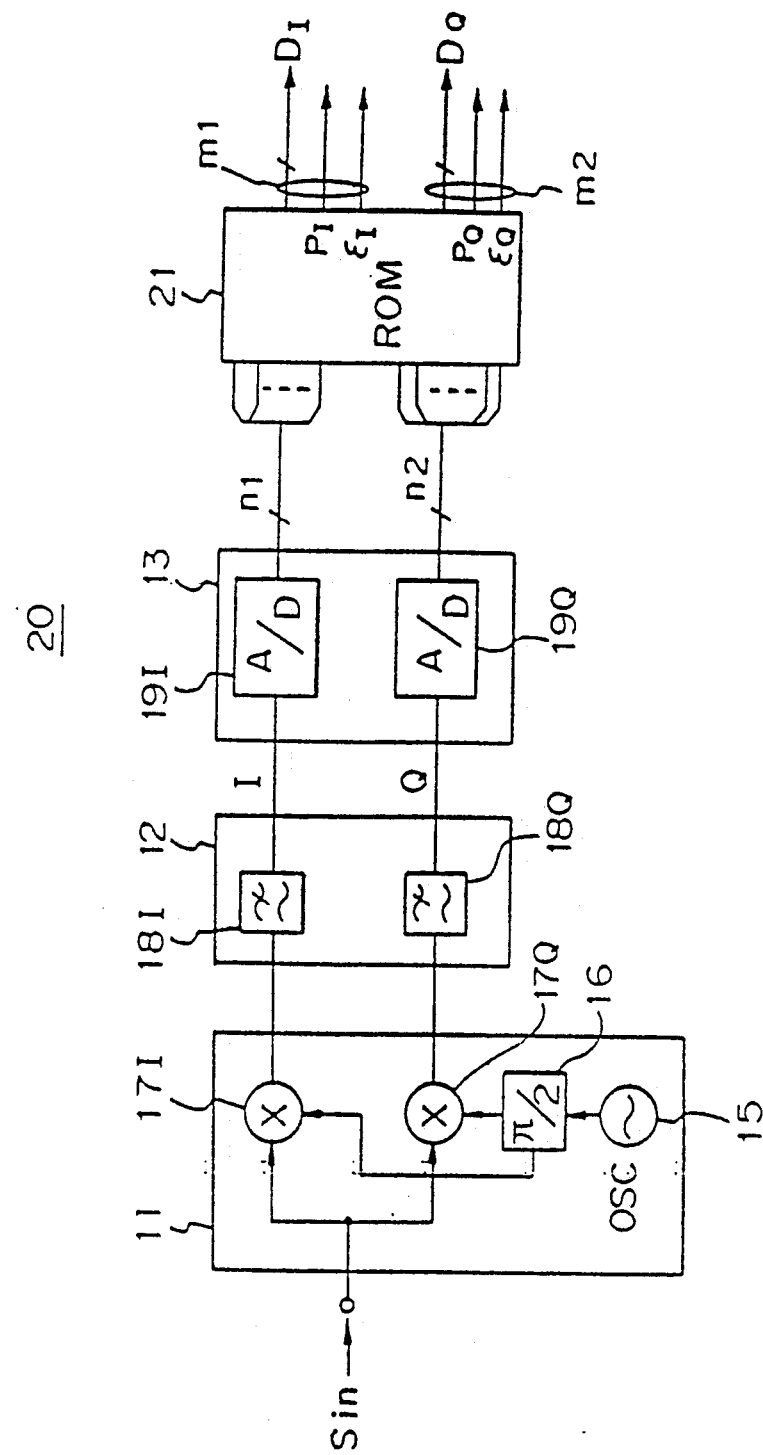
FIG. 6 shows concretely a digital demodulation apparatus of the present invention.

FIG. 6 shows concretely a digital demodulation apparatus of the present invention. The n1 and n2 bit outputs of the A/D converters 19I and 19Q are as explained with reference to FIG. 5. Further, to obtain the error bits, these are read out from the ROM 21 as larger bit output groups (m1 and m2). Note that the positions of the output ports of $P_I$, $\epsilon_I$, $P_Q$, and $\epsilon_Q$ differ from the case of FIG. 4, but these have just been rewritten for convenience in indicating the numbers of bits.

The transmission signal $S_{in}$ of the honeycomb mode modulation is subjected to quadrature detection as in the past by the oscillator 15, $\pi/2$ hybrid 16, and mixers 17I and 17Q in the detector and is thus formed into the I channel and Q channel analog demodulation signals. These signals are wave reshaped by the low pass filters 18I and 18Q and converted to digital demodulation signals by the A/D converters 19I and 19Q. The digital demodulation signals are based on the honeycomb mode modulation, so the original code data $D_I$ and $D_Q$ are reproduced via the ROM 21 along with $P_I$, $\epsilon_I$, and $P_Q$, $\epsilon_Q$.

Figure 7:
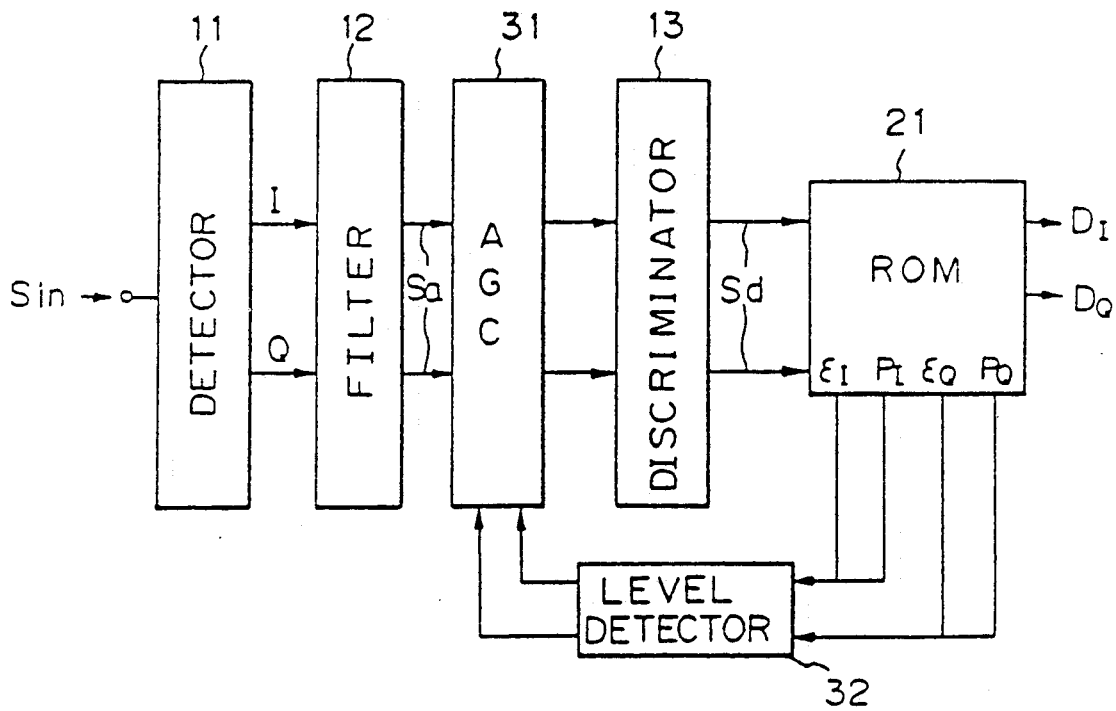
FIG. 7 is a block diagram of a digital demodulation apparatus provided with an automatic gain control means.

FIG. 7 is a block diagram of a digital demodulation apparatus provided with an automatic gain control means. This automatic gain control means performs effective automatic gain control (AGC) on analog demodulation signals having a honeycomb structure signal point arrangement.

In the figure, the digital demodulation apparatus 30 is provided with a detector 11 which receives the transmission signal $S_{in}$ modulated by the multivalue QAM method and performs quadrature detection thereon, a filter 12 which wave reshapes the output and transmits an analog demodulation signal Sa, and a discriminator 13 which produces a digital demodulation signal Sd by A/D conversion of an input thereto. Further, it is provided with a ROM 21 for decoding and reproducing the honeycomb structure modulation signal, which is used to reproduce the original code data $D_I$ and $D_Q$. An automatic gain controller (AGC) is provided at the input side of the discriminator 13 to suppress inclusion of data error in the reproduced code data $D_I$ and $D_Q$. The control input of the AGC 31 is given by the level detector 32. The level detector 32 receives as inputs the P and $\epsilon$ bits from the ROM 21 and output a signal applied as the control input to AGC 31.

Figure 8:
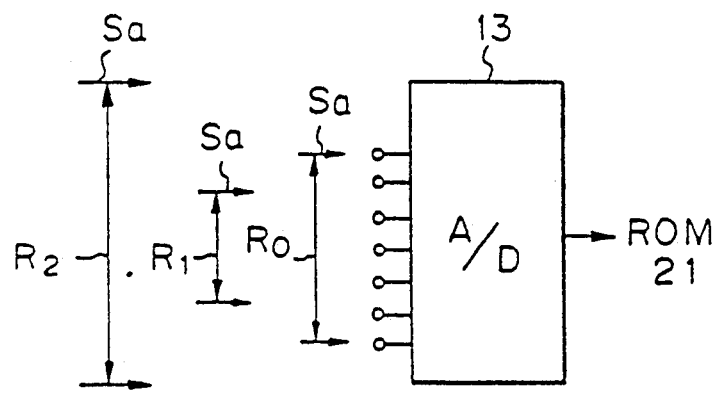
FIG. 8 is a view for explaining the reason why automatic gain control is necessary.

FIG. 8 is a view for explaining the reason why automatic gain control is necessary. For example, unless the dynamic range of an analog demodulation signal Sa at a certain signal point is a predetermined fixed range $R_o$, the discriminator 13 will not perform a normal discriminating operation but will create data errors. That is, the discriminator 13 comprises an A/D converter and the dynamic range where this operates normally is set to a fixed value by prevailing technical specifications. Therefore, even if the level of the analog demodulation signal Sa becomes small as shown by $R_1$ in the figure or conversely becomes large like $R_2$, normal discrimination cannot be performed. Therefore, level detection is performed as indicated below and the signal Sa is subjected to AGC.

Figure 9:
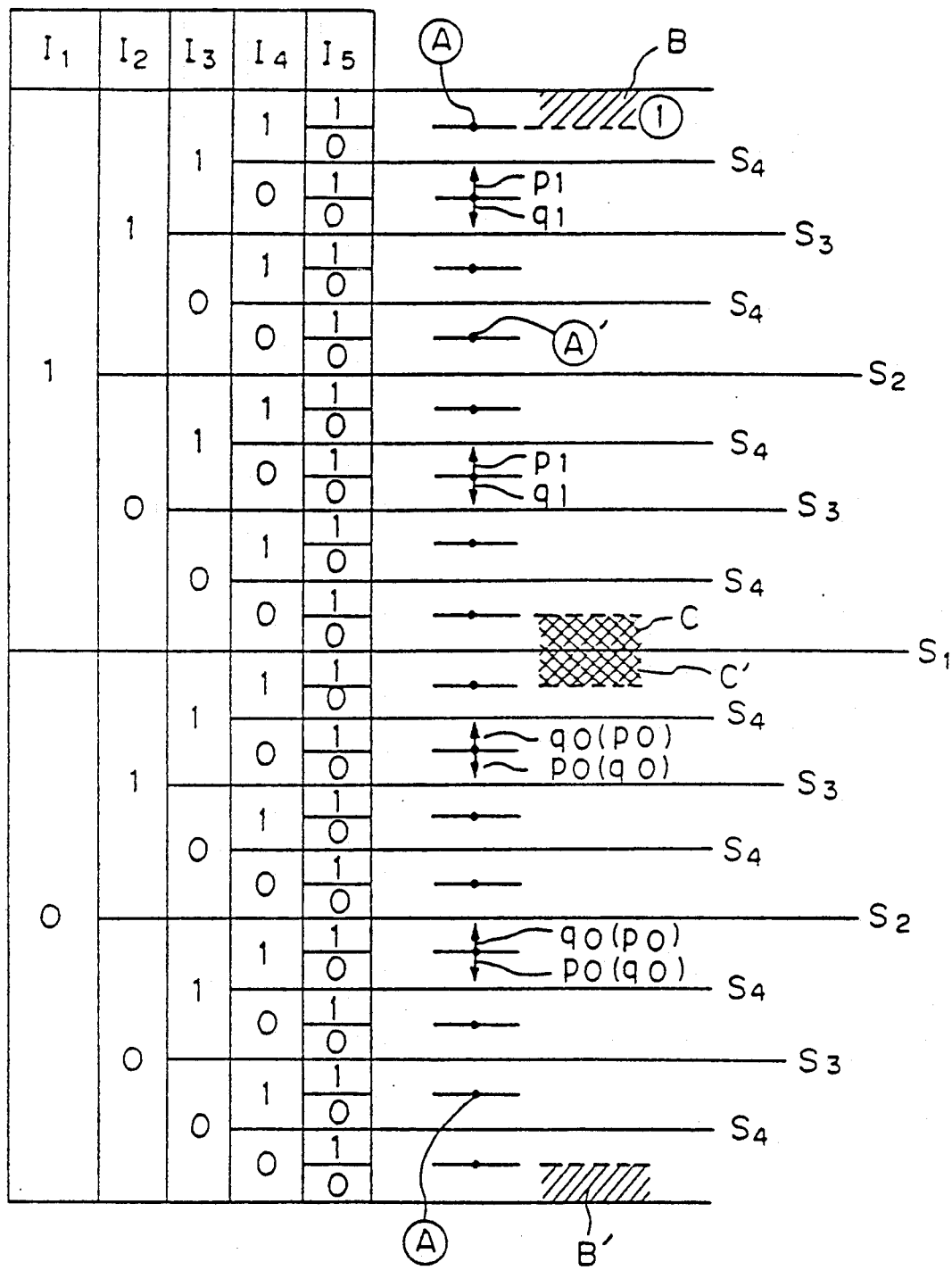
FIG. 9 is a level diagram for explaining the method of level detection based on the present invention.

FIG. 9 is a level diagram for explaining the method of level detection based on the present invention. The level diagram of the figure, however, is drawn based on a general QAM method modulated by an orthogonal grid structure signal point arrangement. It is difficult to express the level detection as a simple step-wise structure level diagram under a modulation method using a honeycomb structure signal point arrangement. Therefore, FIG. 9 is used just for explaining the AGC. Note that under the honeycomb structure modulation method of the present invention, the necessary data corresponding to FIG. 9 is obtained from the ROM 21. Further, the diagram shows the code data $D_I$, but applies exactly the same to the code data $D_Q$. Further, an example is shown of a 256-value signal, that is, a signal with an I channel of 4 bits $I_1$ to $I_4$ (16 value) and a Q channel of 4 bits $Q_1$ to $Q_4$ (16 value), for a total of 256 ($=16 \times 16$). These signal points match the signal point Ⓐ any level in the figure for $D_I$. The threshold value showing which level they match is shown by $S_1$ to $S_4$ (the "1" side and "0" side are symmetrical). These levels are determined by the bit value ("1" and "0") of the bits $I_1$ to $I_4$ of the data $D_I$. Here, $I_1$ is a polarity bit (corresponding to $P_I$ in the present invention), while $I_1$ to $I_4$ show the content of the original data. $I_5$, which is one bit lower than $I_4$, is a so-called error bit (corresponding to $\epsilon_I$ in the present invention) and shows if the fourth bit $I_4$ deviates to either the "1" side or "0" side. Normally, this $I_5$ is used for detection of the pseudo error rate. Giving an example, the signal point Ⓐ expresses the code (1100).

However, if the level of the analog demodulation signal Sa becomes large at the polarity "1" ($I_1$="1") side, the signal points shift uniformly to the side of the arrow p1 and $I_5$ indicates "1". If the level of Sa becomes large at the polarity "0" ($I_1$="0") side, the signal points uniformly shift to the side of the arrow p0 and $I_5$ indicates "0". Conversely, if the level of the analog demodulation signal Sa becomes small at the polarity "1"($I_1$="1") side, the signal points shift uniformly to the side of the arrow q1 and $I_5$ indicates "0". If the level of Sa becomes small at the polarity "0" ($I_1$="0") side, the signal points uniformly shift to the side of the arrow q0 and $I_5$ indicates "1". Taking note of this regularity, if the polarity bit ($P_I$) and the error bit $I_5$ ($\epsilon_I$) of the data $D_I$ from the ROM 21 are taken out and $I_1 \oplus I_5$ (where $\oplus$ is an exclusive OR operation) is calculated, the magnitude of the level can be understood. That is, when the level is large, $$1 \oplus 1 = 0 \tag{1}$$

or $$0 \oplus 0 = 0 \tag{2}$$

stand. A result of the calculation of "0" indicates the level is large, so the gain must be reduced. When the level is small, $$1 \oplus 0 = 1 \tag{3}$$

$$0 \oplus 1 = 1 \tag{4}$$

stand. (A result of the calculation of "1" indicates the level is small, so the gain must be raised.)

The above exclusive OR operation of $I_1$ and $I_5$ should be performed for all signal points, but when the error rate becomes bad, a so-called eye pattern results and the reliability of the signal points themselves drops. There is no meaning in obtain the above exclusive OR using such unreliable data and the AGC becomes inaccurate. When the error rate becomes bad, just the hatched portion B, B' of FIG. 9 (when the signal level is maximum) or the double hatched portion C, C' (when the signal level is minimum) is selected and used as the error bit. No matter how bad the line condition is, no signal point can exist outside of B, B' and, further, no signal point can exist inside of C, C', it was noted.

Figure 10:
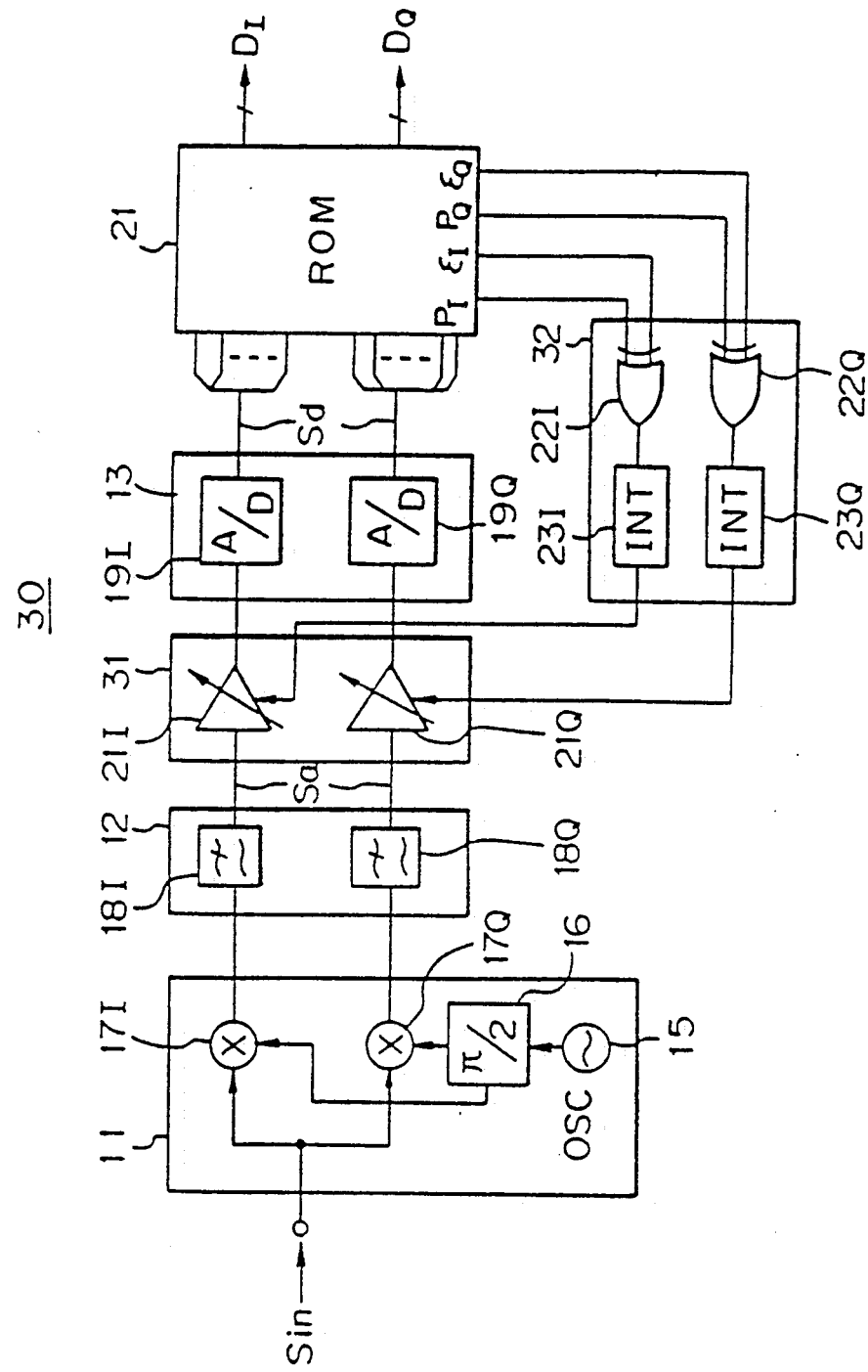
FIG. 10 is a circuit diagram showing a concrete example or a digital demodulation apparatus provided with an automatic gain control means.

FIG. 10 is a circuit diagram showing a concrete example of a digital demodulation apparatus provided with an automatic gain control means. In the digital demodulation apparatus 30, the discriminator 13 is by the afore-mentioned A/D converters shown by 19I and 19Q. The outputs thereof, that is, the digital demodulation signal Sds, are input to the code decision unit comprised of a ROM to obtain the code data $D_I$ and $D_Q$.

As already mentioned, the transmission signal $S_{in}$ of the honeycomb mode modulation is subjected to orthogonal detection as in the past by the oscillator 15, the π/2 hybrid 16, and the mixers 17I and 17Q in the detector 11 and changed to the I channel and Q channel analog demodulation signals Sa, then wave reshaped by the low pass filters 18I and 18Q and changed to the digital demodulation signals Sd by the afore-mentioned A/D converters 19I and 19Q.

The automatic gain controller 31, comprised of the AGC amplifiers 21I and 21Q, applies automatic gain control to the analog demodulation signals Sa. The gain is controlled by the level detector 32, which is comprised of EOR (exclusive OR) gates 22I and 22Q and integrators (INT) 23I and 23Q. The EOR gates 22I and 22Q perform the afore-mentioned exclusive OR operation and receive as input the polarity bits $P_I$ and $P_Q$ and the error bits $\epsilon_I$ and $\epsilon_Q$ from the ROM 21. These operations are performed in parallel by the I channel and Q channel. The integrators 23I and 23Q smooth the level changes for each signal and apply the same to the AGC amplifiers 21I and 21Q. When the level becomes large, the output of the EOR gate 22I (22Q) becomes "0" almost continuously. This is smoothed by the integrator 23I (23Q) and given to the AGC amplifier 21I (21Q), where the gain is lowered. Conversely, when the level becomes small, the output of the EOR gate 22I (22Q) becomes "1" almost continuously. This is smoothed by the integrator 23I (23Q) and given to the AGC amplifier 21I (21Q), where the gain is raised.

Figure 11B:
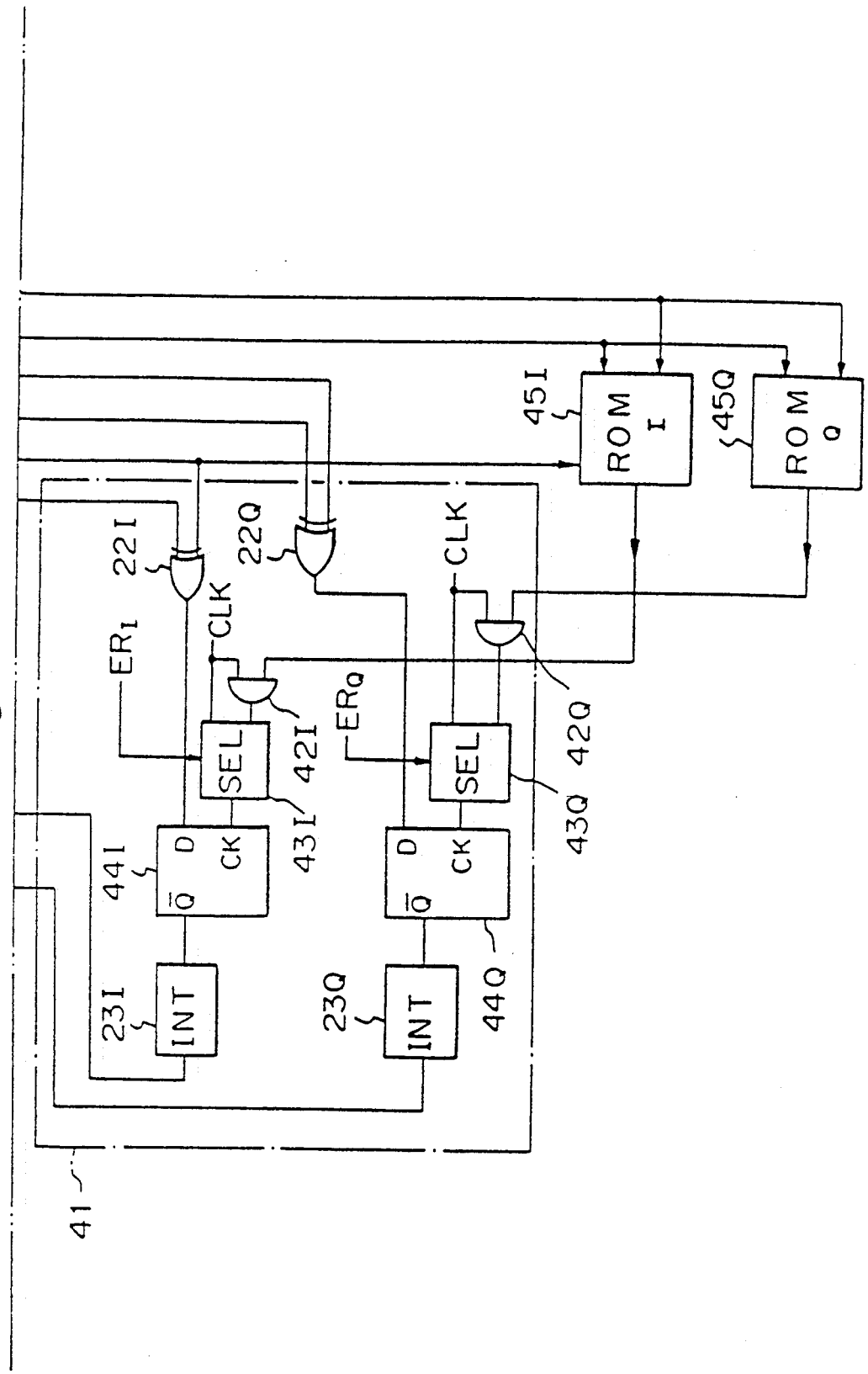

FIGS. 11A and 11B are circuit diagrams showing a modification of the digital demodulation apparatus of FIG. 10. The digital demodulation apparatus 40 performs selective control in accordance with the line conditions. "Selective control" means, as mentioned before, that AGC is performed on all the signal points (A) of FIG. 9 under, for example, general orthogonal grid mode modulation, when the error rate is good and is performed AGC on just the signal points falling in the areas B, B' and C, C' of FIG. 9 when the error rate is bad. In the case of honeycomb mode modulation, the areas corresponding to the above-mentioned areas B, B' and C, C' cannot be found immediately. Therefore, the specific signal point ROM 45I and ROM 45Q are newly provided, which receive as input the code data $D_I$ and $D_Q$ and error bits $\epsilon_I$ and $\epsilon_Q$ illustrated. Note that the ROM 45I and 45Q may be integral in the ROM 21.

On the other hand, reference numeral 41 indicates a level detector comprised of the level detector 32 of FIG. 10 to which has been newly added the selection and hold means 42I, 43I, 44I, 42Q, 43Q, and 44Q. The I channel side and the Q channel side are the same, so explanation will be made just of the I channel side. A selector 43I normally passes a clock CLK as it is, but when an error signal $ER_I$ showing deterioration of the error rate is output, it passes the clock CLK through the AND gate 42I. The error signal ERI may be the output from a general pseudo error rate detector or may be made to be detected by whether or not a specific predetermined pattern received from a transmission side can be correctly received by the reception side.

The flipflop 43I is driven by a clock CLK from a selector 43I, whereby the $\overline{Q}$ output is smoothed by the afore-mentioned integrator 23I.

As mentioned above, the ROM 45I operates as a signal point detector, for example, detects the appearance of a specific signal point falling in an area corresponding to B, B', or C, C' of FIG. 9 under a general orthogonal grid mode modulator. When an output of the signal point detector (ROM) 45I shows there is an error signal $ER_I$ and a specific signal point has appeared, the clock CLK from the selector 43I drives the flipflop 44I only when there is correspondence with B, B' or C, C'. When there is no correspondence with B, B' or C, C', the afore-mentioned condition is held as it is. Therefore, the flipflop 44I is provided.

However, there is something which should be considered further regarding the signal point detector 45I (same for 45Q) of FIG. 11. This is that there is an imbalance in the number of signal points which can fall into signal points B, B' or C, C' under honeycomb mode modulation. This is a problem distinctive to the honeycomb mode modulation/demodulation method.

FIG. 12 shows the gain control for a Q channel in a honeycomb type signal point arrangement. From the figure, the meaning of the imbalance of the number of signal points will become clear. Note that the case of 256-value ($I_1$ to $I_4$) was used as an example in the above explanation, but the figure would become complicated, so the figure shows the case of 64-value. In the figure, the hatching areas B, B' correspond to B, B' of the orthogonal grid of FIG. 9, while the hatched areas C, C' correspond to C, C' of the orthogonal grid of FIG. 9. Further, counting the number of signal points, 10 fall in B, B' and 16 fall in C, C', for an imbalance of almost 1 to 2. Therefore, if matters are left as they are, overcontrol would be exercised when the signal points fall into C, C' and, seen from the long term, proper AGC could not be performed. To eliminate this imbalance, one may thin out suitable data in the signal point detector 45I, i.e., ROM, and ignore some of the signal points in C, C'. For example, the signal points R, S, T, and U may be removed from the control.

Conversely, in FIG. 12, the signal points V and W closest to B, B' are added to the scope of the control. For this purpose, data corresponding to V, W is written into the ROM 45I. Therefore, the problem of the imbalance between B, B' and C, C' is eliminated.

Figure 13:
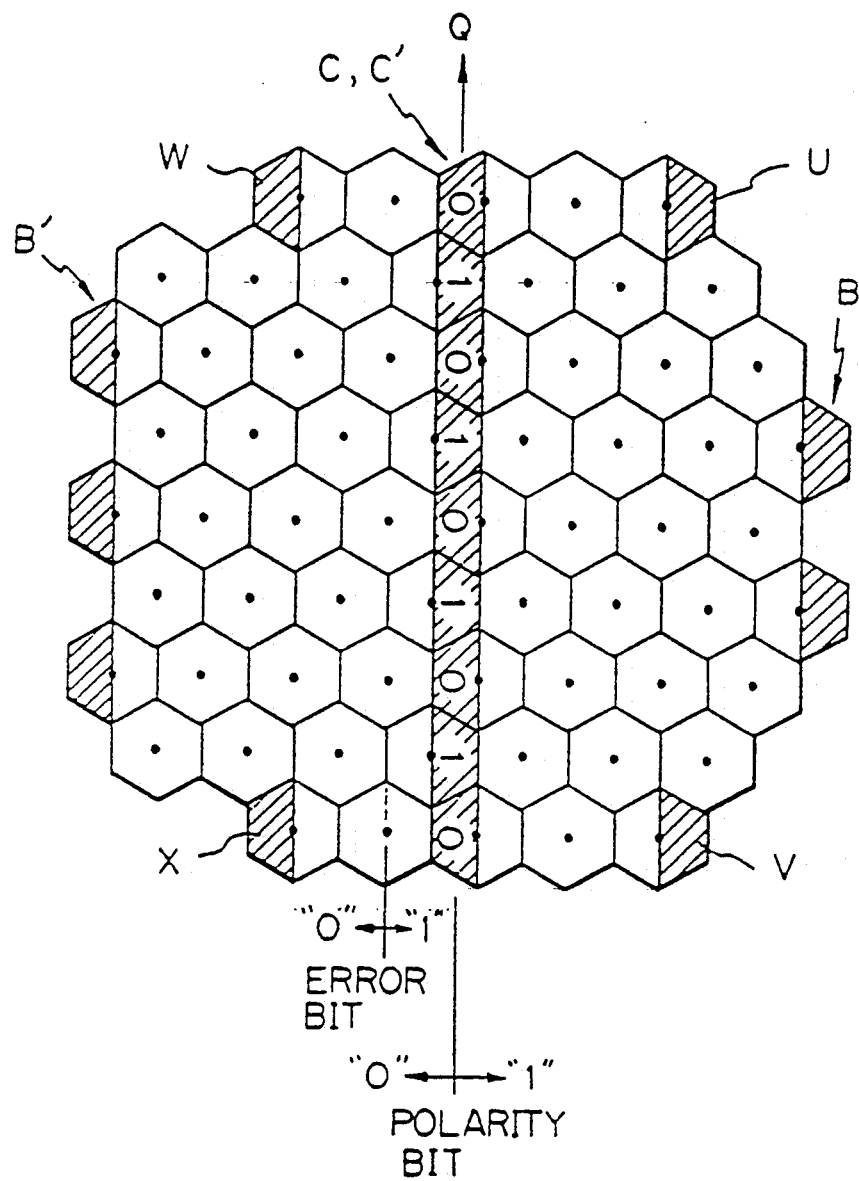
FIG. 13 shows the gain control for an I channel in a honeycomb type signal point arrangement.

FIG. 13 shows the gain control for an I channel in a honeycomb type signal point arrangement. The same problem of imbalance of the number of signal points occurs. The number of signal points on the B, B' side is imbalanced with that on the C, C' side. In this case, for example, U, V, W, X, etc. may be added as signal points on the B, B' side.

However, in the explanation of the above-mentioned FIG. 5, it was stated that the polarity bits cannot be simply determined according to the honeycomb structure signal point arrangement, as clear from FIG. 13. Looking at FIG. 13, when determining if the polarity bit is "0" or "1", as illustrated, the boundary becomes zigzagged and simple distinction becomes impossible.

Figure 14:
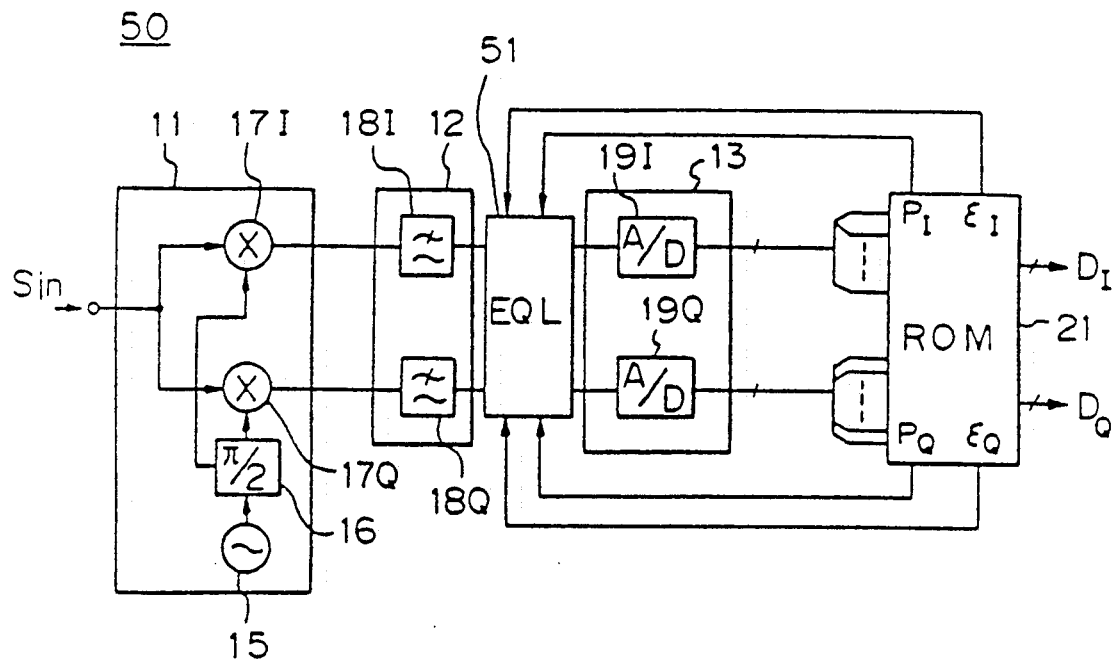
FIG. 14 shows a first example of a digital demodulation apparatus including an equalizer.

FIG. 14 shows a first example of a digital demodulation apparatus including an equalizer. The figure shows use of the polarity bits $P_I$, $P_Q$ and error bits $\epsilon_I$, $\epsilon_Q$ from the ROM 21 for equalization control parameters of an equalizer. Due to convenience in illustration, the outputs of $P_I$, $\epsilon_I$ and the outputs of $P_Q$, $\epsilon_Q$ are arranged separately, in contrast to the afore-mentioned illustration.

In general, an equalizer (EQL) is essential for a circuit susceptible to fading and the like. Using the polarity bits $P_I$, $P_Q$ and the error bits $\epsilon_I$, $\epsilon_Q$ of the digital demodulation signal as equalization control parameters, it changes the tap coefficients of the transversal filter adaptively and reproduces a normal waveform.

Figure 15:
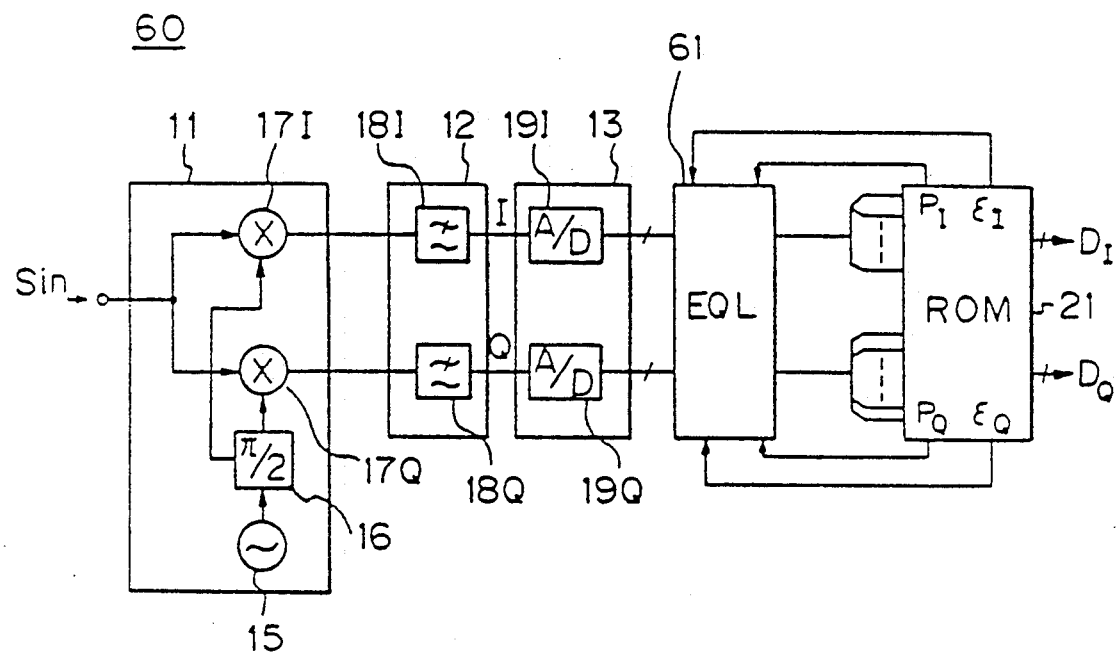
FIG. 15 shows a second example of a digital demodulation apparatus including an equalizer.

FIG. 15 shows a second example of a digital demodulation apparatus including an equalizer. While FIG. 14 shows an analog equalizer 51, a digital equalizer 61 is shown in FIG. 15. In this case, the analog/digital (A/D) converters 19I, 19Q are placed at opposite sides from FIG. 14. In general the digital equalizer 61 suffers from smaller deterioration compared with the analog equalizer 51.

Figure 16:
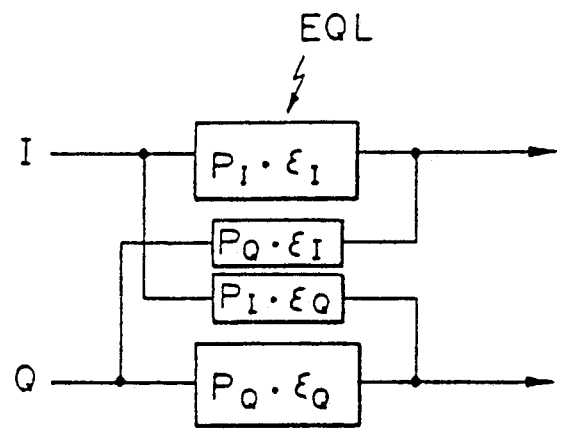
FIG. 16 shows the general construction of an equalizer.

FIG. 16 shows the general construction of an equalizer. Four types of equalizers ($P_I$, $\epsilon_I$, $P_Q$, $\epsilon_I$, $P_i$, $\epsilon_Q$ and $P_Q$, $\epsilon_Q$) are shown. The circuits $P_I$, $\epsilon_I$ and $P_Q$, $\epsilon_Q$ work against the inter symbol interference in the same channel, while the circuits $P_I$, $\epsilon_Q$ and $P_Q$, $\epsilon_I$ work against the inter symbol interference among channels.

Figure 17:
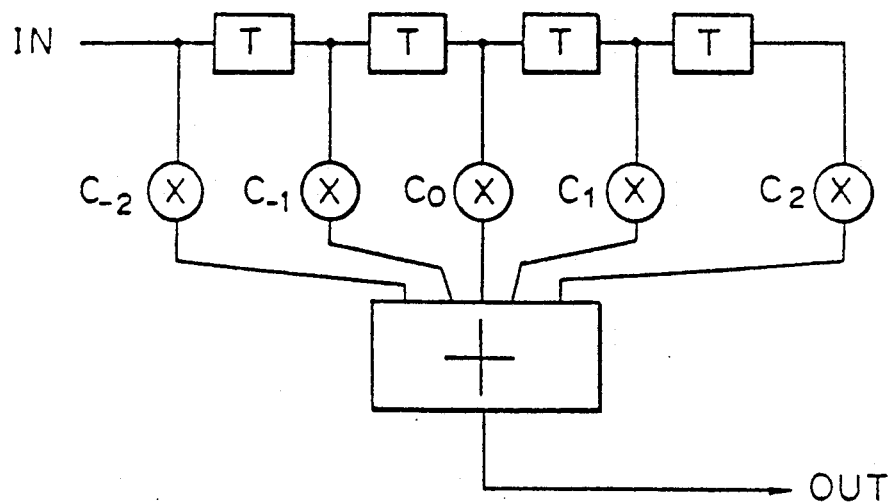
FIG. 17 shows an example of a known equalizing circuit.

FIG. 17 shows an example of a known equalizing circuit. "T" shows a delay unit, "X" a multiplying unit, "$C_{-2}, C_{-1}, \ldots C_2$" tap coefficients, and "+" an adder. These may be analog or digital in format and are both in wide use.

Figure 18:
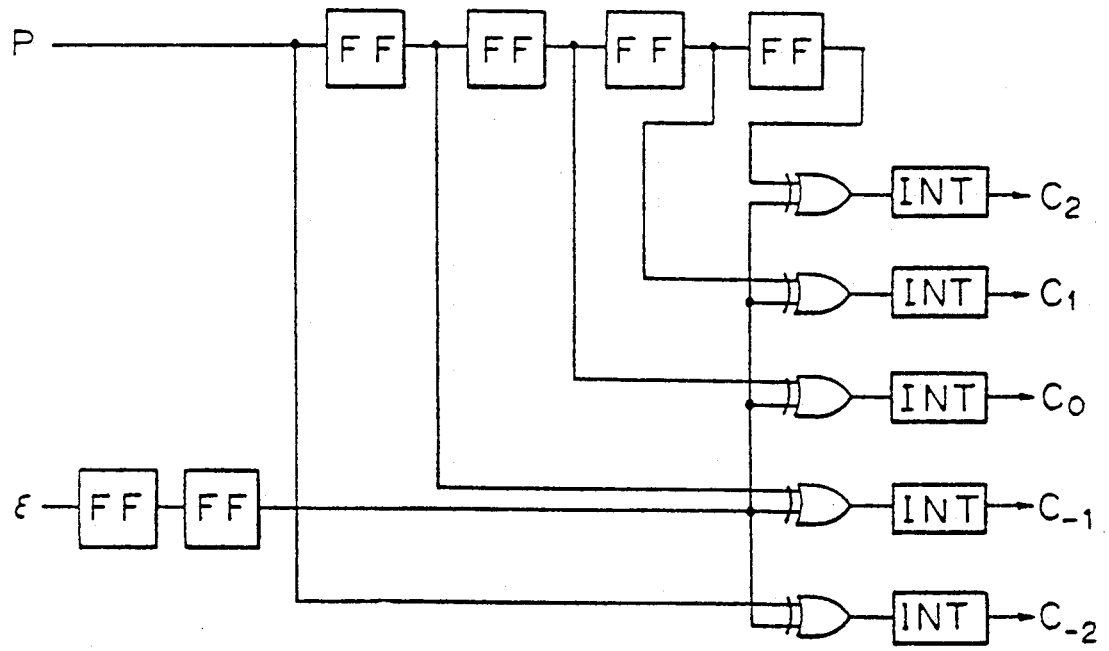
FIG. 18 shows an example of a known tap coefficient generating circuit.

FIG. 18 shows an example of a known tap coefficient generating circuit. EOR is an exclusive OR gate, FF is a flipflop, and INT is an integrator. Note that the input P and $\epsilon$ select $P_I$ or $P_Q$ and $\epsilon_I$ or $\epsilon_Q$ corresponding to those of the equalization circuits 71 to 74 of FIG. 16.

Figure 19:
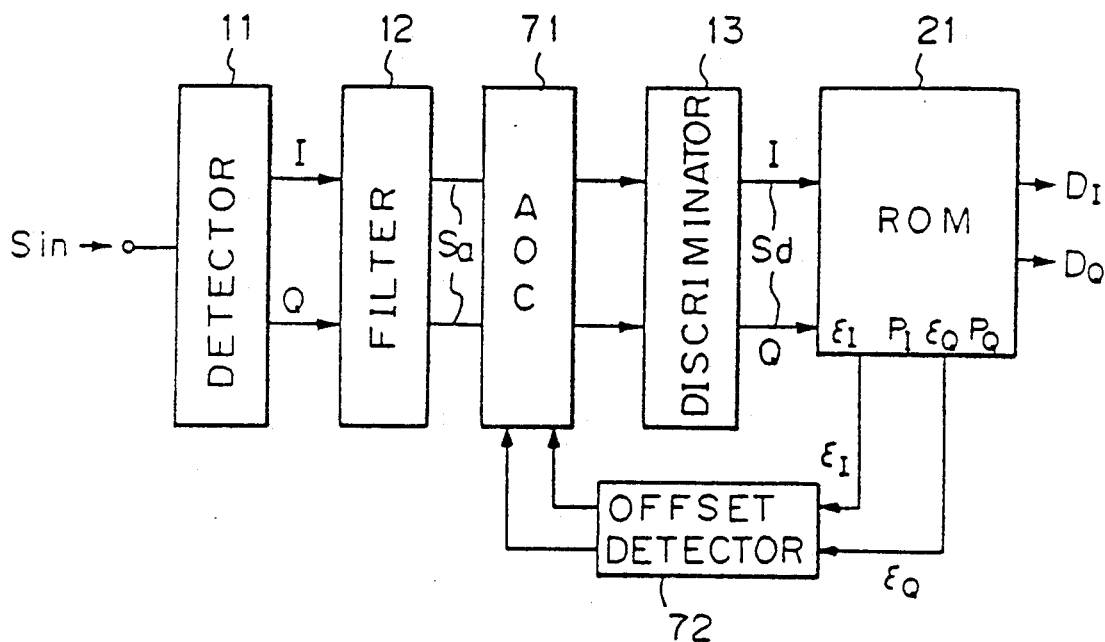
FIG. 19 is a block diagram of a digital demodulation apparatus provided with an automatic DC offset controller.

FIG. 19 is a block diagram of a digital demodulation apparatus provided with an automatic DC offset controller. In the figure, the digital demodulation apparatus 70 is provided with a detector 11 which receives the transmission signal $S_{in}$ modulated by the multivalue QAM method, having a honeycomb structure signal point arrangement, and performs quadrature detection thereon, a filter 12 which wave reshapes the output and transmits an analog demodulation signal Sa; and a discriminator 13 which produces a digital demodulation signal Sd by A/D conversion of an input thereto. Further, it is provided with a ROM 21 for decoding and reproducing the honeycomb structure modulation signal, which is used to reproduce the original code data $D_I$ and $D_Q$. An automatic offset controller (AOC) 71 is provided at the input side of the discriminator 13. The control input of the AOC 71 is given from an offset detector 72, which offset detector 72 receives as input $\epsilon$ bits from the ROM 21 and detects the offset.

Figure 20:
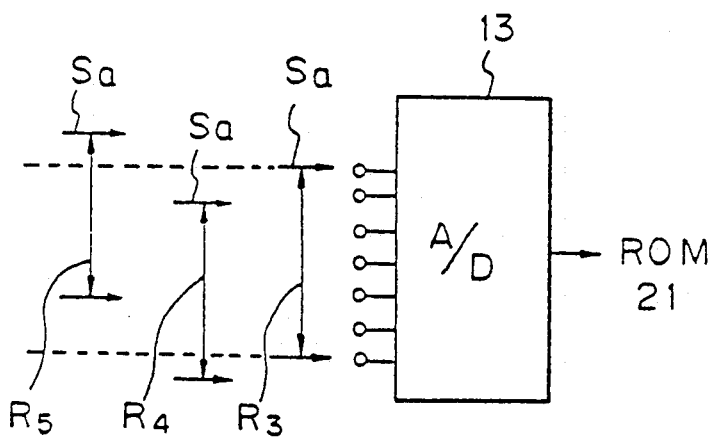
FIG. 20 is a view explaining the reason why DC offset control is necessary.

FIG. 20 is a view explaining the reason why DC offset control is necessary. For example, unless the dynamic range of an analog demodulation signal Sa of a certain signal point is a predetermined set range $R_3$, the discriminator 13 will not perform a normal discrimination operation and will create a, data error. That is, the discriminator 13 is comprises of an A/D converter. The dynamic range in which this operates normally is set to a fixed value by industrial specifications. Therefore, even if the level of the analog demodulation signal Sa, due to the DC offset, is shifted to the negative side as in $R_4$ in the figure or is shifted to the positive side a in $R_5$, normal discrimination cannot be performed. Therefore, the offset is detected as follows and offset adjustment is performed on the signal Sa.

The operation of the AOC 71 of FIG. 19 will be explained below using the level diagram of the aforementioned FIG. 9.

If the DC level of the analog demodulation signal Sa is shifted to the positive side at the side of polarity "1" ($I_1$="1"), the signal points all uniformly shift to the side of the arrow p1 and $I_5$ indicates "1". If the DC level of Sa shifts to the positive side at the polarity "0" ($I_1$="0") side, the signal points uniformly shift to the side of the arrow (p0) and $I_5$ still indicates "1". Conversely, if the DC level of the analog demodulation signal Sa becomes shifts to the negative side at the polarity "1" ($I_1$="1") side, the signal points shift uniformly to the side of the arrow p1 and $I_5$ indicates "0". If the DC level of Sa shifts to the negative side at the polarity "0" ($I_1$="0") side, the signal points uniformly shift to the side of the arrow (q0) and $I_5$ indicates "0". Taking note of this regularity, if just the error bit $I_5$ ($\epsilon_I$) of the data $D_I$ from the ROM 21 is taken out, it is possible to determine if the offset is to positive or negative side.

The above monitoring of $I_5$ ($\epsilon_I$) may be performed for all signal points, but when the error rate becomes bad, a so-called eye pattern results and the reliability of the signal points themselves drops. There is no meaning in monitoring the above $I_5$ ($\epsilon_I$) using such unreliable data and the DC offset control becomes inaccurate. When the error rate becomes bad, just the hatched portion B, B' of FIG. 9 (when the signal level is maximum) or the double hatched portion C, C' (when the signal level is minimum) is selected and just the error bit at that portion is monitored. No matter how bad the line condition, no signal points can exist outside of B, B'. Further, even if the gain of the amplifier of the previous stage (not shown) becomes smaller and the number of signals falling in B, B' falls, a control signal can be obtained.

Figure 21:
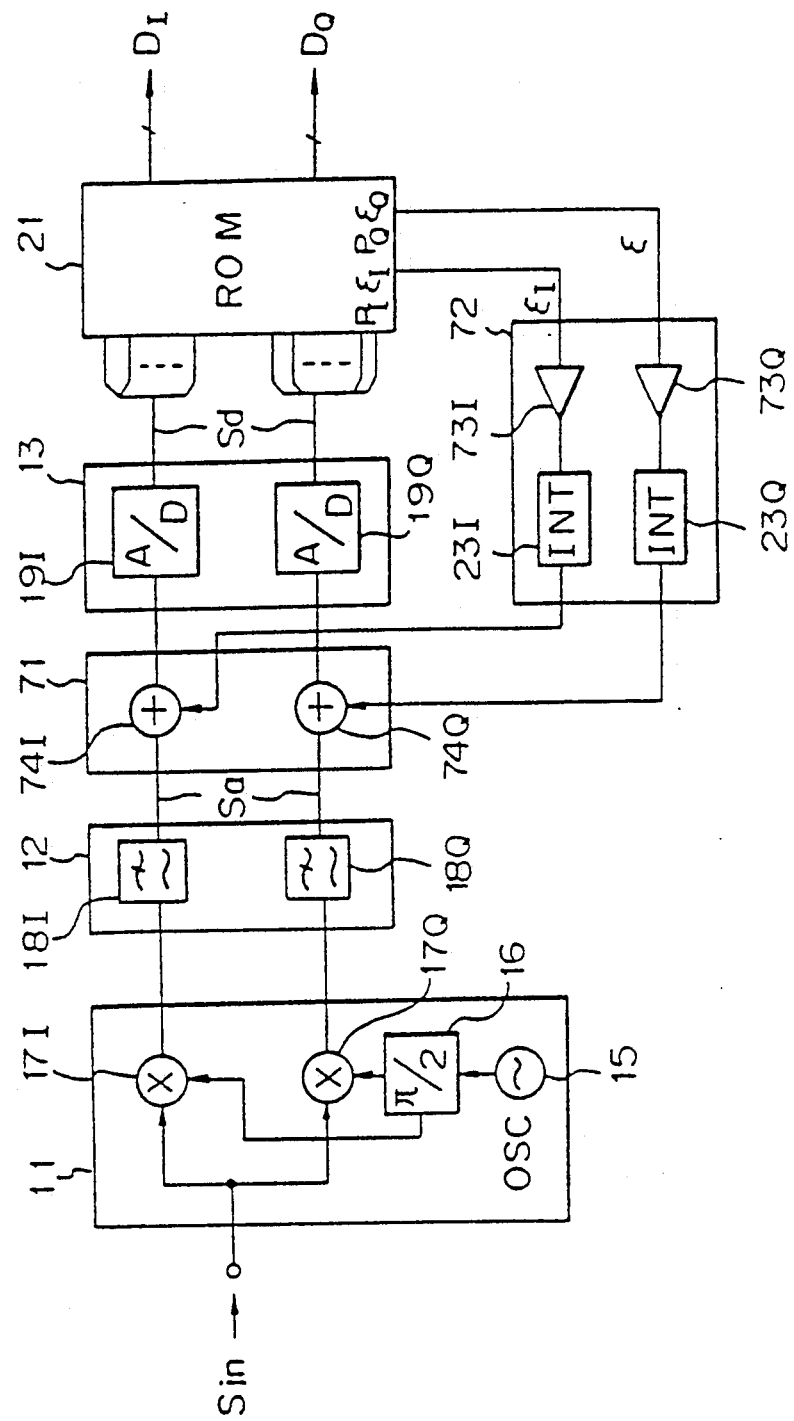
FIG. 21 is a circuit diagram showing a concrete example of a digital demodulation apparatus provided with an automatic DC offset controller.

FIG. 21 is a circuit diagram showing a concrete example of a digital demodulation apparatus provided with an automatic DC offset controller. In the figure, the discriminator 13 comprises A/D converters, shown by 19I and 19Q. The outputs thereof, that is, the digital demodulation signals Sd, are input to the code decision unit comprised of a ROM to obtain the code data $D_I$ and $D_Q$.

As already mentioned, the transmission signal $S_{on}$ of the honeycomb mode modulation is subjected to orthogonal detection as in the past by the oscillator 15, the $\pi/2$ hybrid 16, and the mixers 17I and 17Q in the detector 11 and thus changed to the I channel and Q channel analog demodulation signals Sa. These signals are then wave reshaped by the low pass filters 18I and 18Q and changed to the digital demodulation signals Sd by the afore-mentioned A/D converters 19I and 19Q.

The offset control of the analog demodulation signal Sa is performed by the DC offset controller 71, which is, for example, comprised of the adders 74I and 74Q. An adjustment level is given to the same by the offset detector 72, which comprises buffer amplifiers 73I and 73Q and integrators 23I and 23Q and which receives as input error bits $\epsilon_I$, $\epsilon_Q$. This offset detection is performed in parallel at the I channel and Q channel. The integrators 23I and 23Q smooth the DC level shift for each signal point and apply the same to the adders 74I and 74Q. When the DC lev el shifts to the positive side, the error bit $\epsilon_I(\epsilon_Q)$ becomes "1" almost continuously. This is smoothed by the integrator 23I continuously. This is smoothed by the integrator 23I (23Q). The rising integration output is, for example, inverter in polarity, then the result is given to the adder 74I (74Q), where the DC level of the signal Sa is lowered. Conversely, when the DC level shifts to the negative side, the error bit $\epsilon_I(\epsilon_Q)$ becomes "0" almost continuously. This is smoothed by the integrator 23I (23Q). The descending integration output is, for example, inverted in polarity, and the result is given to the adder 74I (74Q), where the DC level of the signal Sa is raised. FIGS. 22A and 22B are circuit diagrams showing a modification of a digital demodulation apparatus of FIG. 21. The digital demodulation apparatus 80 performs selective control in accordance with the line conditions. "Selective control" means, as mentioned before, that DC offset control is performed on all the signal point (A) of FIG. 9 under, for example, the orthogonal grid mo modulation, when the error rate is good and performing DC offset control on just the signal points falling in the areas B, B' and C, C' of FIG. 9 when the error rate is bad.

In the figure reference numeral 81 is an offset detector comprising the offset detector 72 of FIG. 21 to which has been newly added the selection and hold means 42I, 43I, 44I, 42Q, 43Q, and 44Q. The circuit operation, however, is the same as that explained in FIG. 11. When an output of a specific signal point detector (ROM) 45I (45Q) showing there is an error signal $ER_I$ ($ER_Q$) and a specific signal point has appeared is generated, the clock CLK from the selector 43I (43Q) has just the $\epsilon_I$ ($\epsilon_Q$) in the area corresponding to the above B, B' or C, C' in the flipflop 44I (44Q) and, at areas other than the same (B, B' and C, C' ) and when there is an error signal $ER_I$ ($ER_Q$), outputs the just preceding $\epsilon_I$ ($\epsilon_Q$) from the $\overline{Q}$ output as it is.

When there is no error signal $ER_I$($ER_Q$), the selector 43I (43Q) gives the clock CLK to the corresponding flipflop at all times. .Note that the error signal is as explained with reference to FIG. 11. Further, there is something which should be considered further regarding the specific signal point detector (ROM) 45I (45Q). This is that there is an imbalance in the number of signal points which can fall into signal points B, B' or C, C'. This is a problem distinctive to the honeycomb mode modulation/demodulation method.

An explanation of this problem and measures against the same are as given in reference to FIG. 12 and FIG. 13. Further, the measures apply to the equalizers of FIG. 14 and FIG. 15. The measures also apply to the carrier recovery mentioned subsequently.

The polarity bits $P_I$, $P_Q$ and error bits $\epsilon_I$, $\epsilon_Q$ from the ROM 21 shown in FIG. 4 and FIG. 6 may be used not only for the afore-mentioned AGC 31, EQL 51 and 61, and AOC 71, but may also be used effectively for carrier reproduction.

Figure 23:
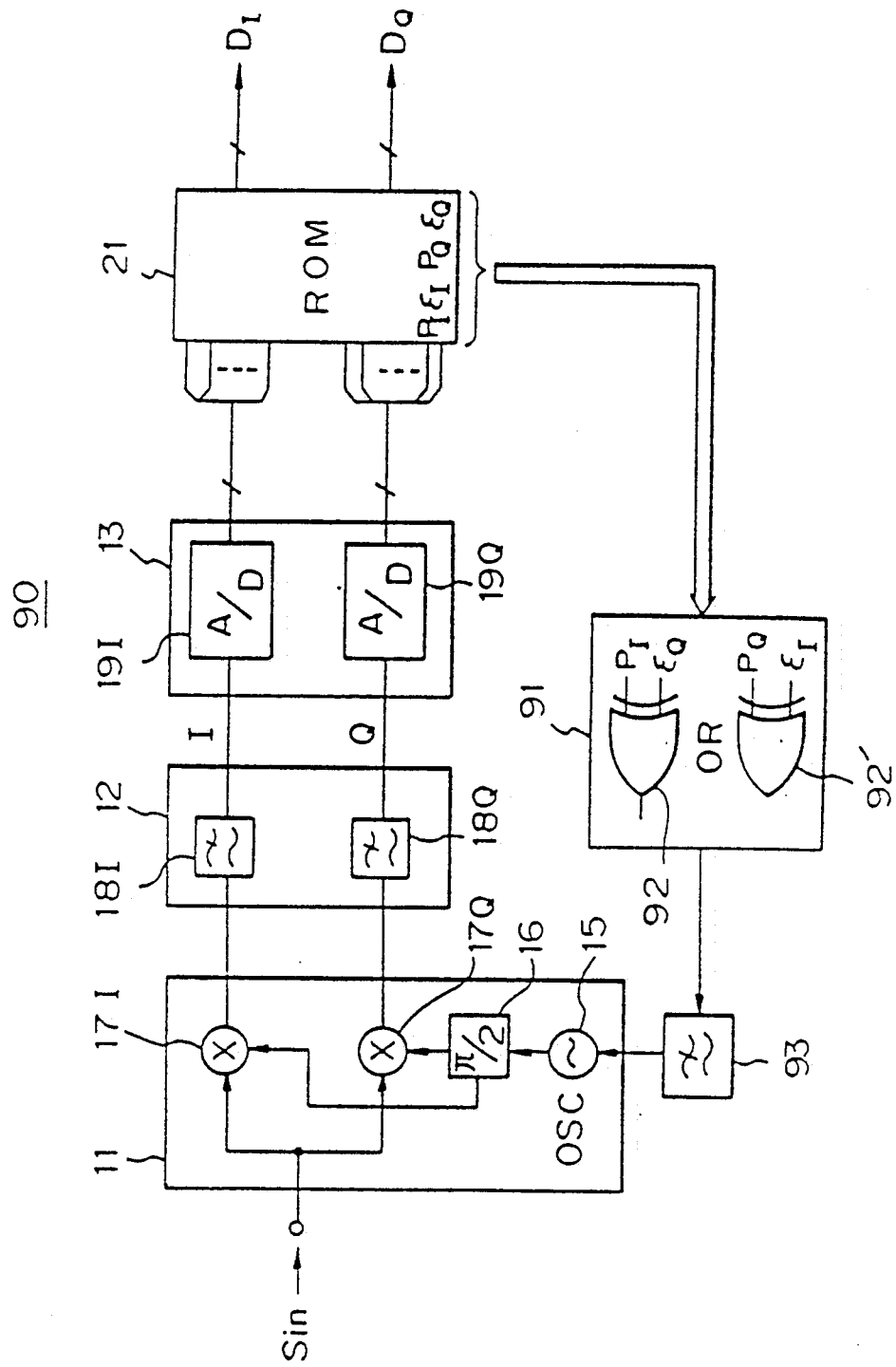
FIG. 23 is a circuit diagram of a digital demodulation apparatus provided with a carrier recovery control means.

FIG. 23 is a circuit diagram showing a digital demodulation apparatus provided with a carrier reproduction control means. It shows an example of incorporation in the apparatus of FIG. 6. "Carrier reproduction control" means, when the phases of signal points deviate overall to the plus side or minus side, operates to shift the carrier phase to the plus side or minus side synchronized with this deviation. In FIG. 23, this phase deviation is detected by the phase detector 91. The output showing the phase deviation controls the oscillation phase of the oscillator 15 used for the carrier oscillation through the loop filter 93. The oscillator 15 in this case is a voltage-controlled oscillator (VCO).

Figure 24:
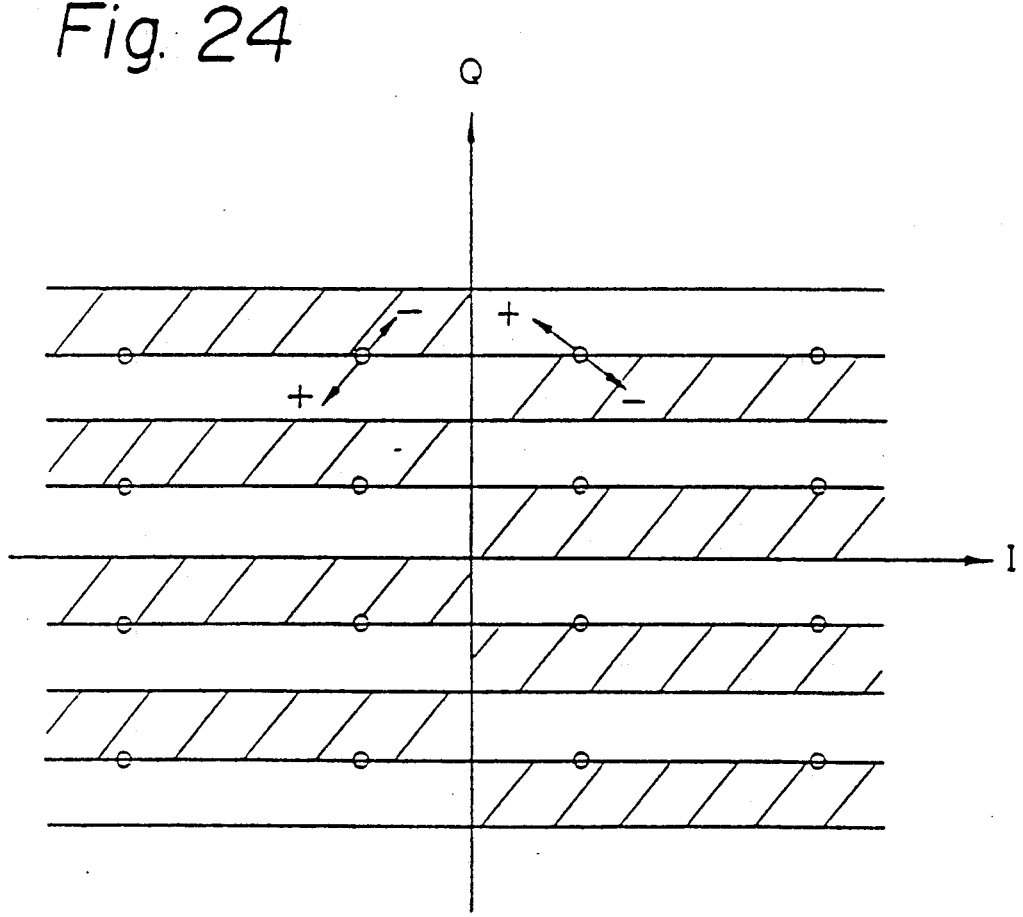
FIG. 24 is a diagram of a signal point arrangement for explaining the phase deviation of signal points.

FIG. 24 is a diagram of a signal point arrangement for explaining the phase deviation of signal points. However, it is shown by a general signal point arrangement under orthogonal grid mode modulation. In the figure, the signals are shown with small circles. The phase leads or lags are shown respectively by + or − marks as shown by the arrows. For example, if the exclusive OR ($I_1 \oplus Q_5$) of the polarity bit $I_1$ and error bit $I_5$ is taken, $I_1 \oplus Q_5 = 1$ stands at the hatched areas of the figure, which show minus phase deviation. For example, if $I_1 = 0$ and $Q_5 = 1$, $0 \oplus 1 = 1$. Conversely, if $I_1 \oplus Q_5$ is 0, positive phase deviation is shown. Therefore, under the honeycomb mode modulation method, it is possible to determine the direction of the phase deviation according to whether $P_I \oplus \epsilon_Q$ is 1 or 0. The same thing applies to detection by $P_Q \oplus \epsilon_I$. Therefore, the phase detector 91 of FIG. 23 is constituted by the EOR gate 92 which finds $P_I \oplus \epsilon_Q$ or the EOR gate 92' which finds $P_Q \oplus \epsilon_I$.

Figure 25:
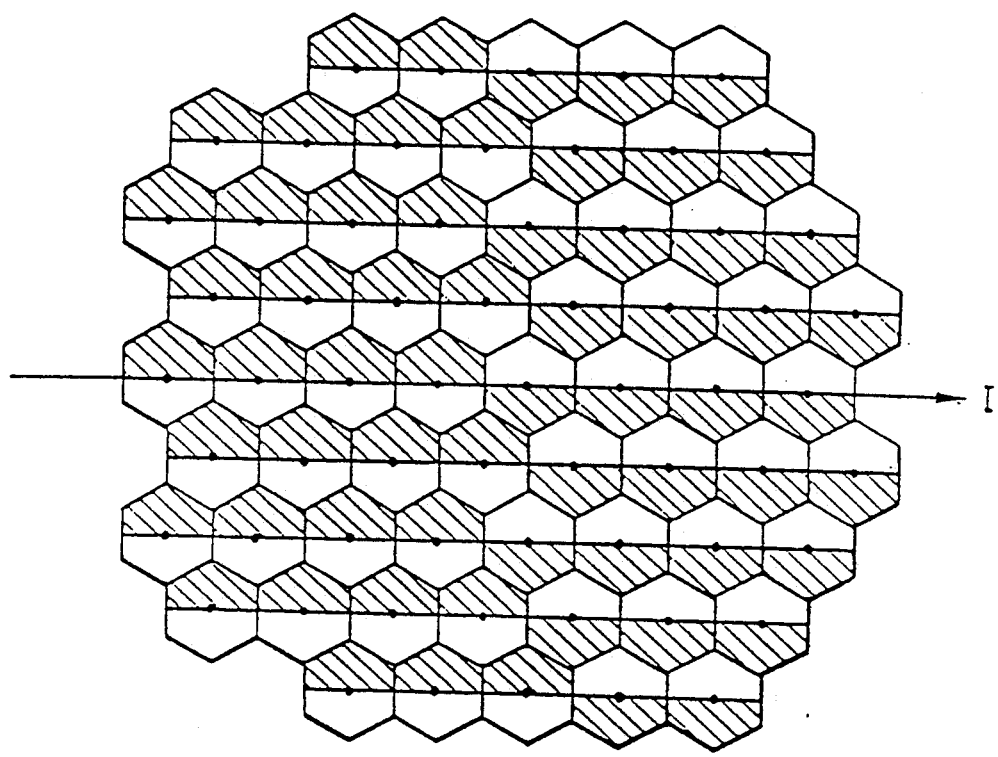
FIG. 25 is a view showing, by hatching, the area for the I channel under honeycomb mode modulation, corresponding to the hatching area of FIG. 24 (orthogonal grid mode)

FIG. 25 is a view showing, by hatching, the area for the I channel under honeycomb mode modulation, corresponding to the hatched area of FIG. 24 (orthogonal grid mode).

Figure 26:
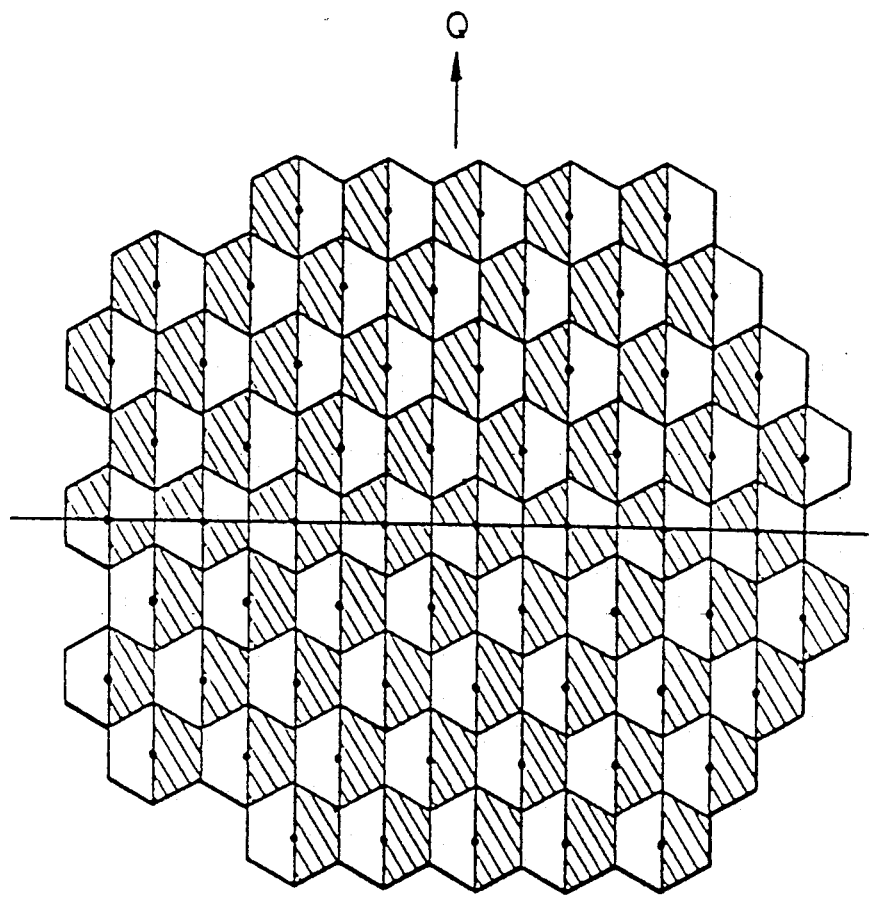
FIG. 26 is a view showing, by hatching, the area of the Q channel under honeycomb mode modulation, corresponding to the hatching area of FIG. 24 (orthogonal grid mode)

FIG. 26 is a view showing, by hatching, the area for the Q channel under honeycomb mode modulation, corresponding to the hatched area of FIG. 24 (orthogonal grid mode).

As shown by the partial mapping in the ROM 21 of FIG. 5, read out of code data, including error bits, for all signal points, would require an extremely large capacity ROM. Since the capacity of high speed bipolar PROM's is generally small, use must be made of an MOS PROM offering a large capacity at an inexpensive price. However, MOS types are inherently slow in operating speed. Therefore, as the afore-mentioned ROM 21, use is made of a plurality of MOS types. That is, a plurality of ROM's for reading out a series of code data in parallel and alternately by a time division mode are used to form the ROM 21.

Figure 27:
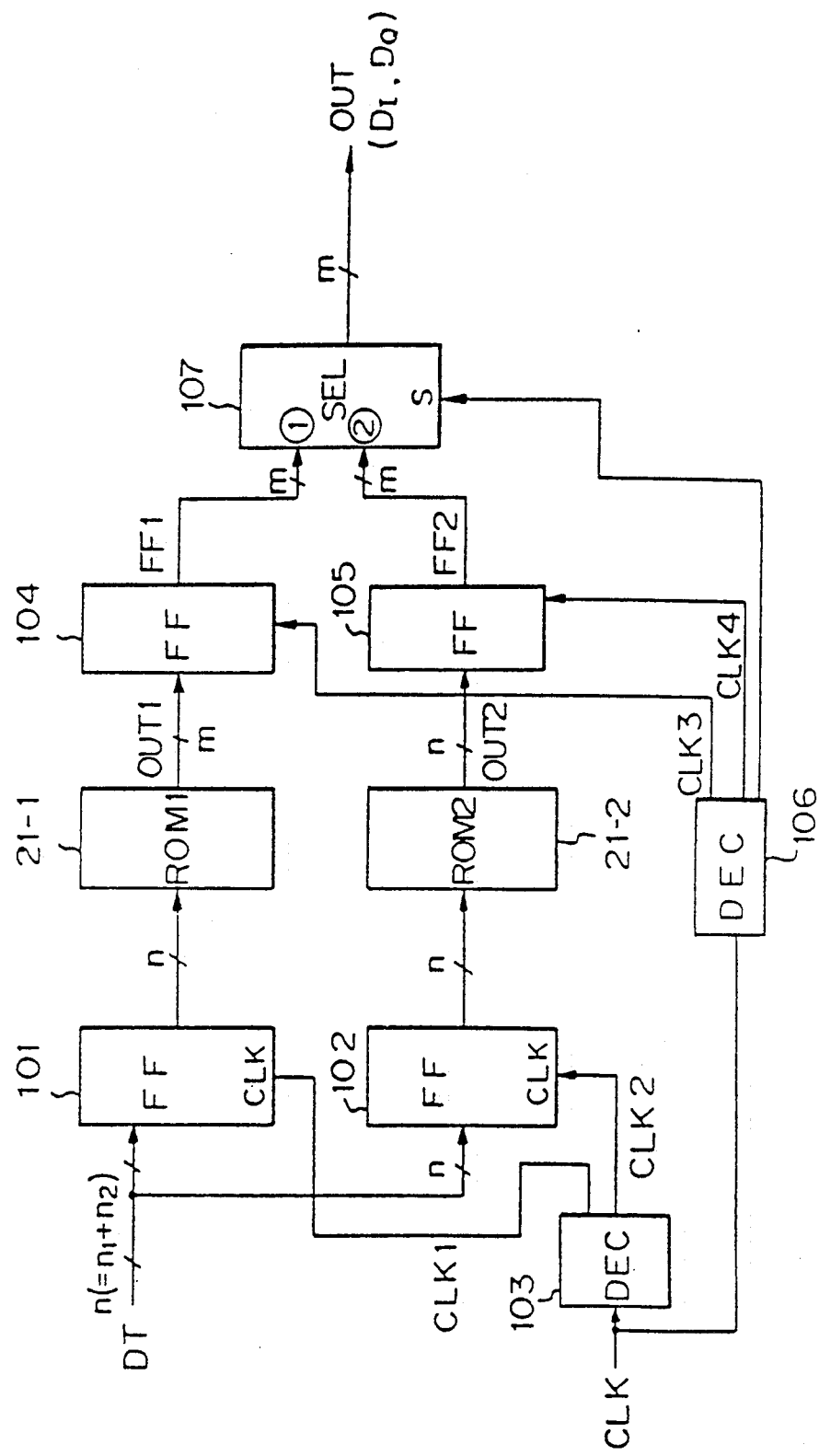
FIG. 27 is a block diagram of a circuit showing a first specific example of the ROM 21.
Figure 28:
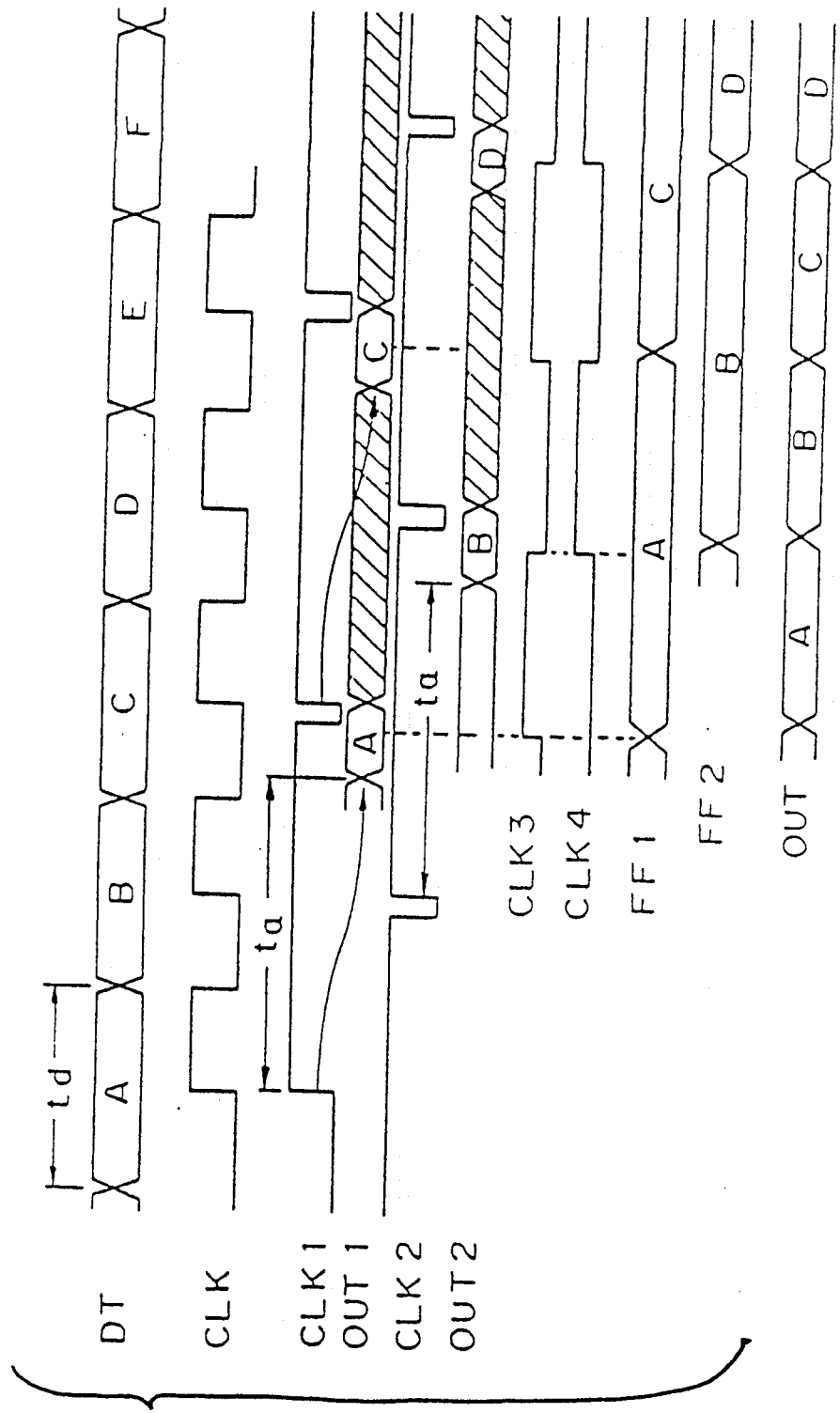
FIG. 28 is a timing chart used for explaining the operation of the circuit of FIG. 27.

FIG. 27 is a block diagram of a circuit showing a first specific example of the ROM 21. In the figure, the ROM 21 comprises two ROM's (ROM1 and ROM2) 2-1 and 21-2. Note that the figure shows the case of use of ROM's with a performance of $t_d < t_a < 2t_d$. Here, $t_a$ is the access time of the ROM's, and $t_d$ is the period of the data of the digital demodulation signal $S_d$ (FIG. 7) from the discriminator 13. The data is shown as DT at the top left of FIG. 27. After being read out in parallel in the time division mode, it is output as the code data OUT ($D_I + D_Q$) shown at the right in the figure. FIG. 28 is a timing chart used for explaining the operation of the circuit of FIG. 27. The operation of the ROM 21 in FIG. 27 will be clear from the timing chart of FIG. 28. The signals DT, CLK, CLK1, CLK2, OUT1, OUT2, FF1, FF2, OUT, etc. of the main parts of FIG. 27 are shown in FIG. 28 in the rows lettered with the same symbols. Referring to the two figures, the data DT is input as A, B, C . . . and the data lengths are the afore-mentioned $t_d$. The reference clock CLK is divided into the clocks CLK1 and CLK2 by the decoder (DEC) 103 and these clocks latch the data A, B, C . . . by the flip-flops (FF) 101 and 102. The data latched by the FF 101 is A, C, E . . . and by FF 102 is B, D, F . . . These are output in parallel and alternately as the corresponding code data OUT1 and OUT2 (hatched portions show unidentified portions of data) through the ROM 21-1 and 21-2. The access time of the ROM at this time is the afore-mentioned $t_a$. OUT1 and OUT2 are latched by the flipflops (FF) 104 and 105. The timing of the latching is determined by the division clocks CLK3 and CLK4 from the decoder (DEC) 106. Therefore, from the flip-flops 104 and 105, the output FF1 of A, C. . . and the output FF2 of B, D. . . are respectively transmitted and applied to the first and second ports (1) and (2) of the selector (SEL) 107. The selector 107 receives the select signal from the decoder 106, selects selectively and alternatively one of the same, and obtains the output OUT of A, B, C, D. . .

Figure 29:
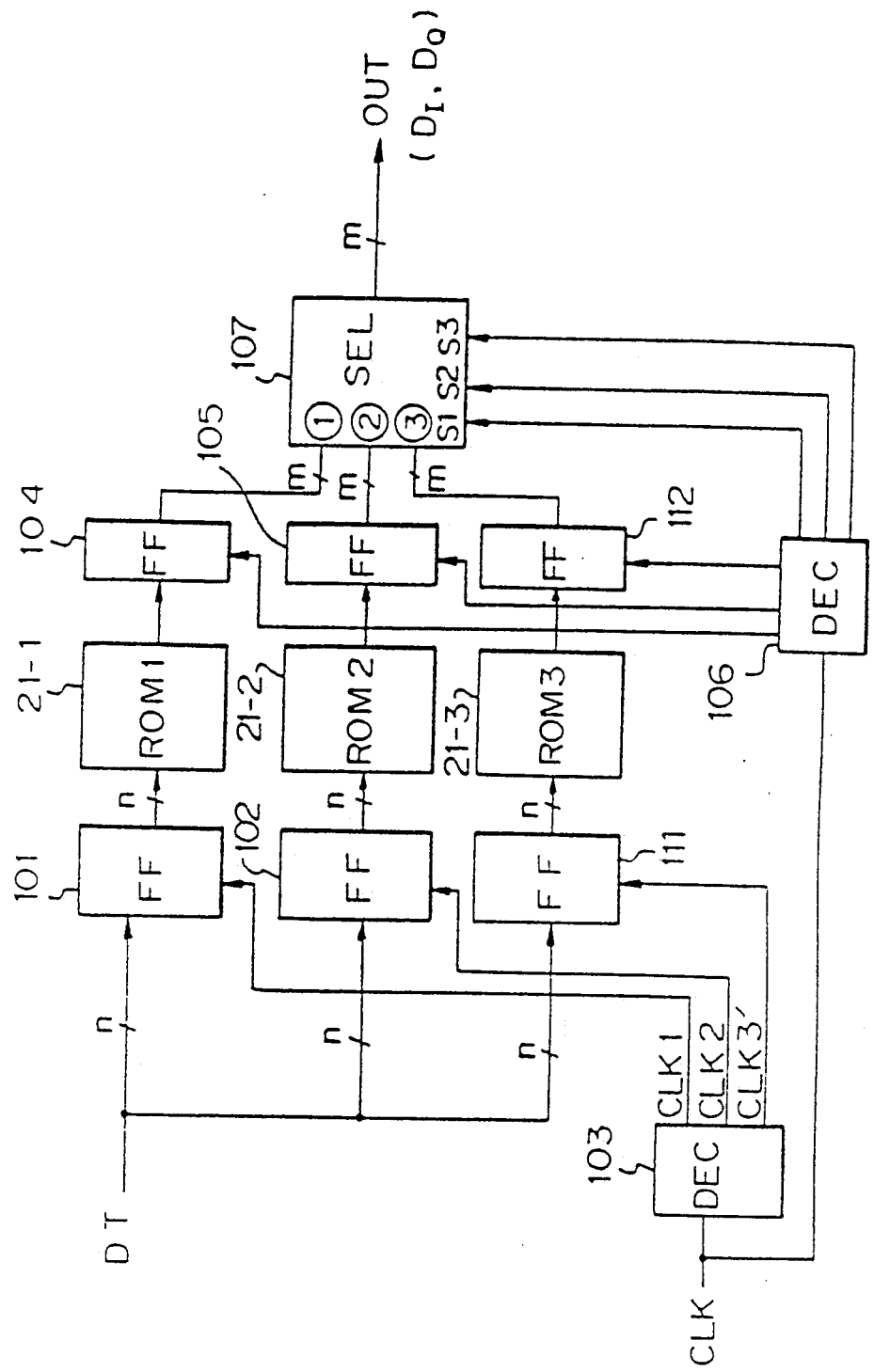
FIG. 29 is a circuit diagram showing a second specific example of the ROM 21.

FIG. 29 is a circuit diagram showing a second specific example of the ROM 21. In the figure, the ROM 21 comprises three ROM's (ROM1, ROM2, and ROM3) 21-1, 21-2, and 21-3. The figure shows the case of use of ROM's with a performance of $2t_d < t_a < 3t_d$.

Figure 30:
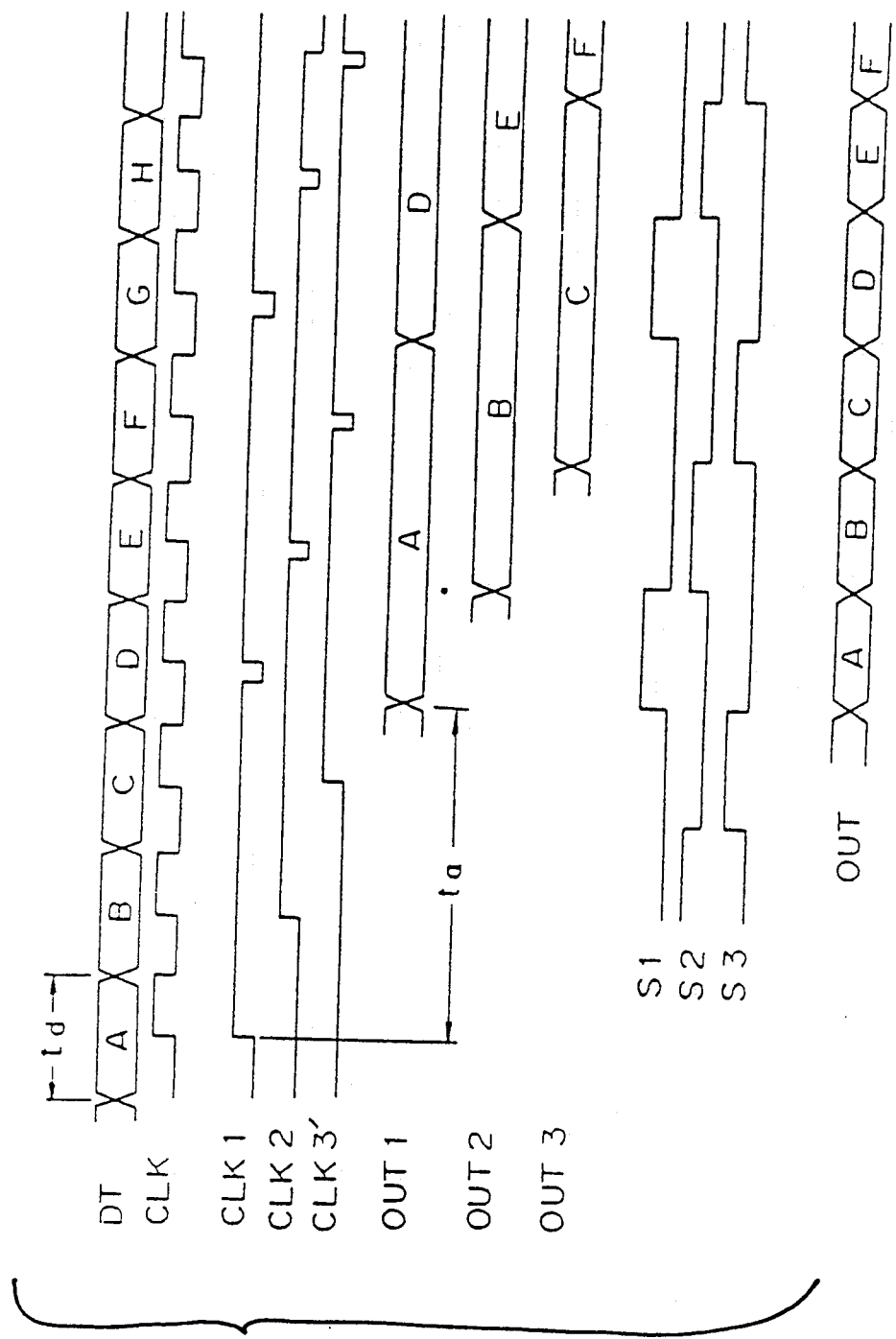
FIG. 30 is a timing chart showing the operation of the circuit of FIG. 29.

FIG. 30 is a timing chart showing the operation of the circuit of FIG. 29. The basic operation is completely the same as that explained by FIG. 27 and FIG. 28. The difference lies in the increase of one stage of flipflops (111, 112), the use of a three-port input for the selector 107, and the increase of one more type of clock (CLK3'). Further, the select signal terminal includes S1, S2, and S3.

Since the ROM 21 becomes large in capacity, use is made of MOS memories in the above embodiments (FIG. 27 and FIG. 29) and the defect of MOS memories of low speed operation is resolved by parallel operation of a plurality of MOS memories. In the embodiment discussed next, the ROM 21 is constructed hierarchically so as to reduce the required capacity of the ROM 21. This embodiment will be discussed with FIG. 31.

Figure 31:
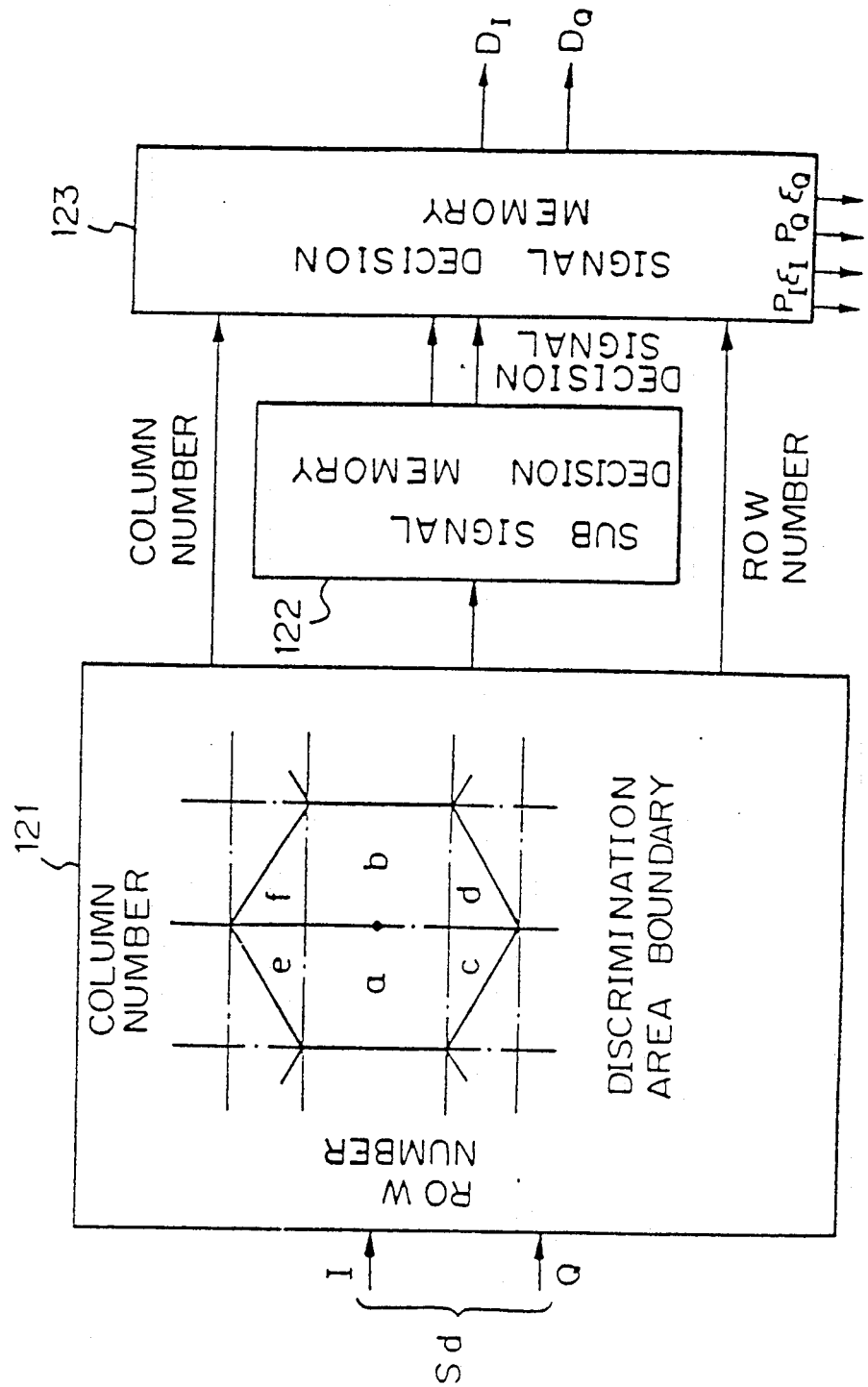
FIG. 31 is a principle diagram for explaining another example of the construction of the ROM 21.

FIG. 31 is a principle diagram for explaining another example of the construction of the ROM 21.

This is provided with a discrimination means 121 which divides the discrimination areas of all signal points into rows and columns, for example, dividing the hexagonal discrimination area of a single signal point in the honeycomb mode signal point arrangement into a rectangular first and second area a and b and triangular first to fourth areas c, d, e, and f, and which finds the row number and column number from the demodulation signals I and Q. The ROM 21 also includes sub signal decision memory 122 which on whether the above-mentioned triangular first to fourth areas c, d, e, and f in the rectangular area of the intersection of rows and columns are up or down; and a signal decision memory 123 which reads out the data of the signal points from the row numbers and column numbers from the discrimination means 121 and the decision signal from the sub signal decision memory 122.

The discrimination means 121 comprises a ROM or arithmetic circuit, and finds the row numbers and column numbers from the digital demodulation signal Sd (I, Q), and determines if the triangular areas c, d, e, and f are up or down in the rectangular area of the intersection of rows and columns, the decision signal and row numbers and column numbers serving as the address signal of the signal decision memory 13.

When the rectangular areas a and b are shown by row numbers and column numbers, it is possible to read out the decode data deciding on the signal points from the signal decision memory 13 by the row numbers and column numbers, without using the decision signal from the sub signal decision memory 122. However, in the case of row numbers and column numbers including the triangular areas c, d, e, and f, the decision on the signal points differs depending on whether they are up or down in the rectangular area of the matrix intersection, so the sub signal decision memory 122 is used to determine the up or down position in the rectangular area. In the case of the decision signal being added to the signal decision memory 123 and of row numbers and column numbers including the triangular areas c, d, e, and f, the correct signal point can be determined.

Figure 32:
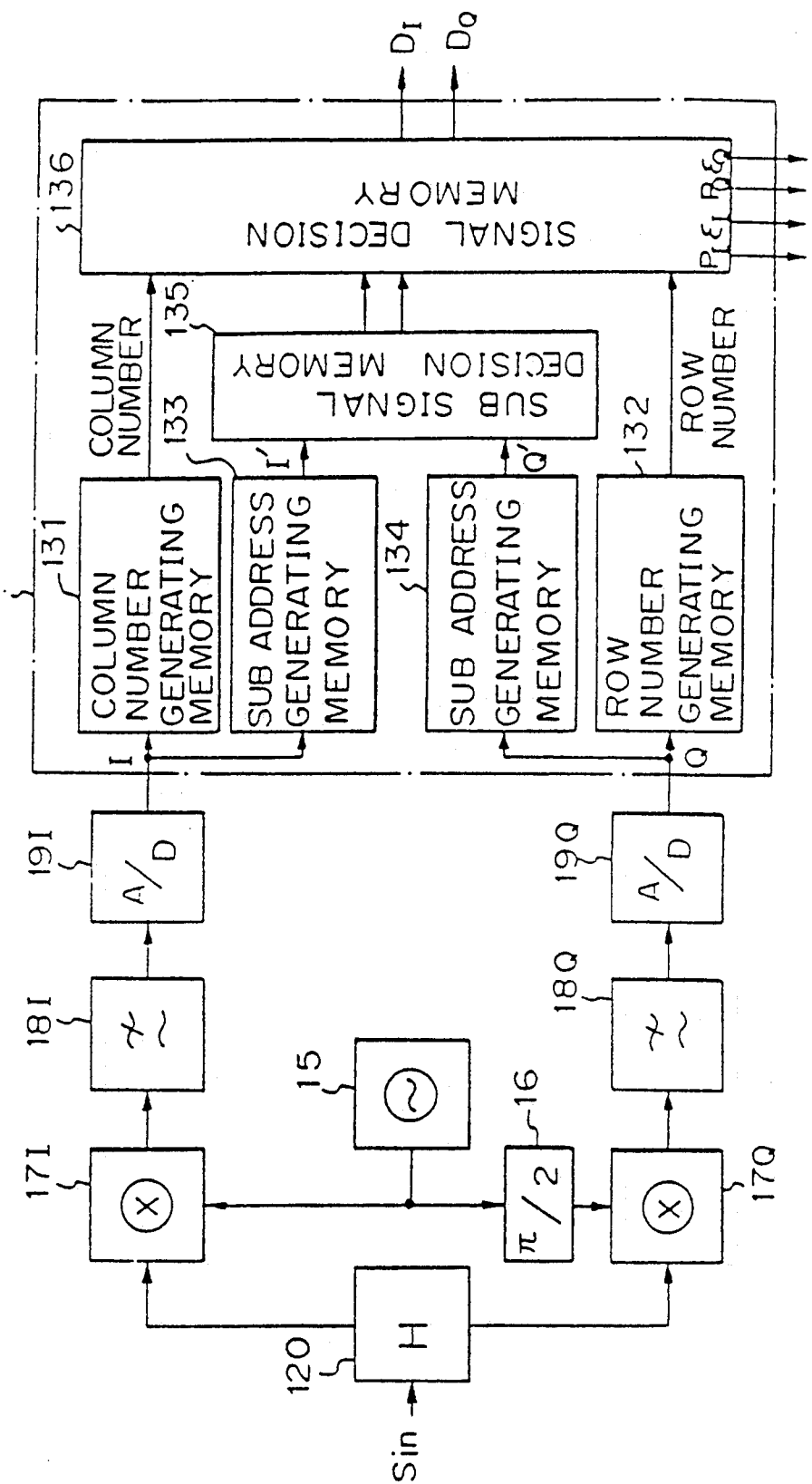
FIG. 32 is a block diagram showing the digital demodulation apparatus 100 including a specific example of the ROM 21 of FIG. 31.

FIG. 32 is a block diagram showing the digital demodulation apparatus 100 including a specific example of the ROM 21 of FIG. 31. Note that elements that are the same as those previously explained are given the same reference numerals or symbols. Note too that reference numeral 120 is a hybrid circuit, illustration of which was omitted in the previous embodiments. In the ROM 21 of FIG. 32, reference numeral 131 is a column number generating memory, 132 a row number generating memory, 133 and 134 sub address generating memories, 135 a sub signal decision memory, and 136 a signal decision memory. The column number generating memory 131, the row number generating memory 132, and the sub address generating memories 133 and 134 comprise the discrimination means 121 (FIG. 31). These memories are all ROM's.

Figure 33:
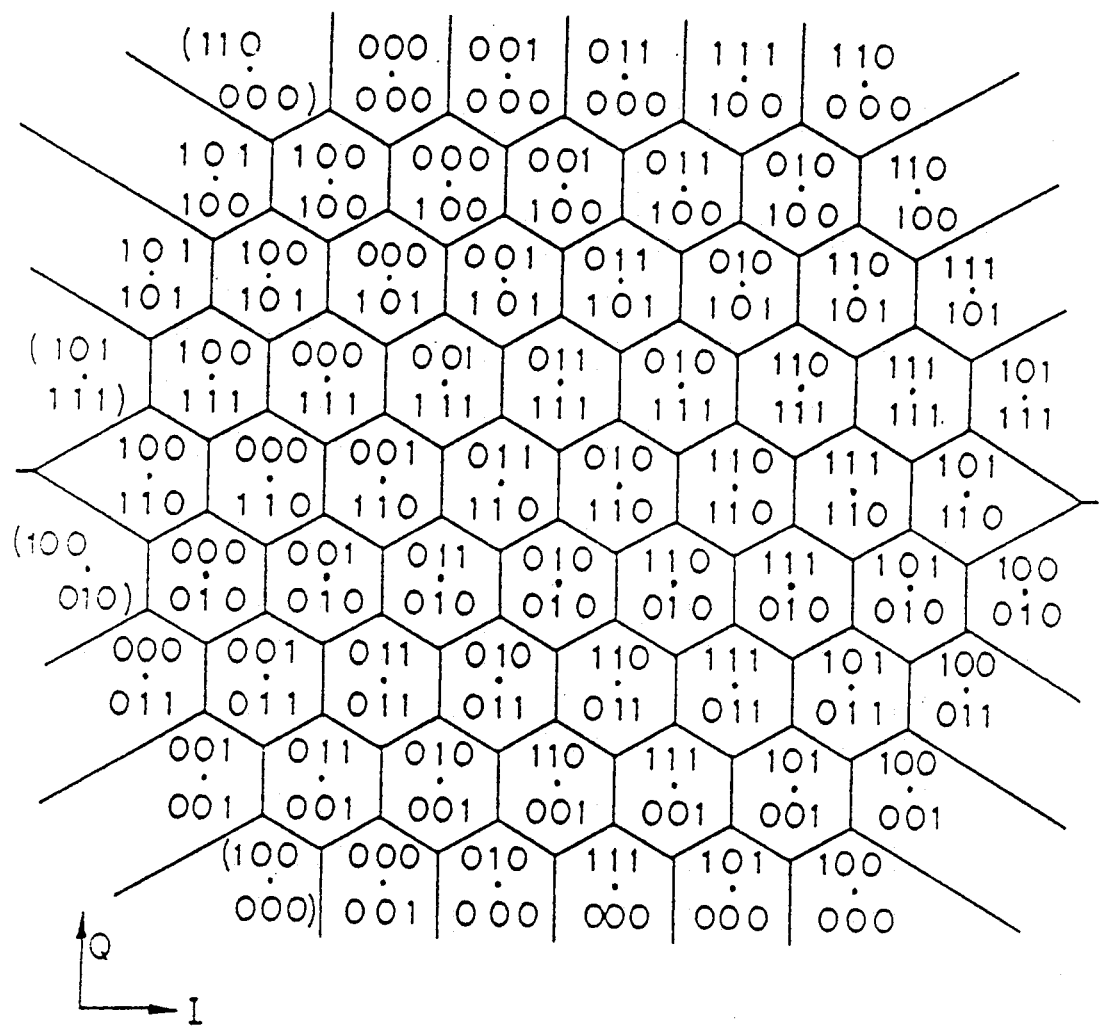
FIG. 33 is a view for explaining the signal point decision boundary by a 64-value QAM method serving as a honeycomb mode signal point arrangement.

FIG. 33 is a view for explaining the signal point decision boundary of a 64-value QAM method serving as a honeycomb mode signal point arrangement. The signal points correspond to I channel and Q channel data each comprised of 3 bits.

Figure 34:
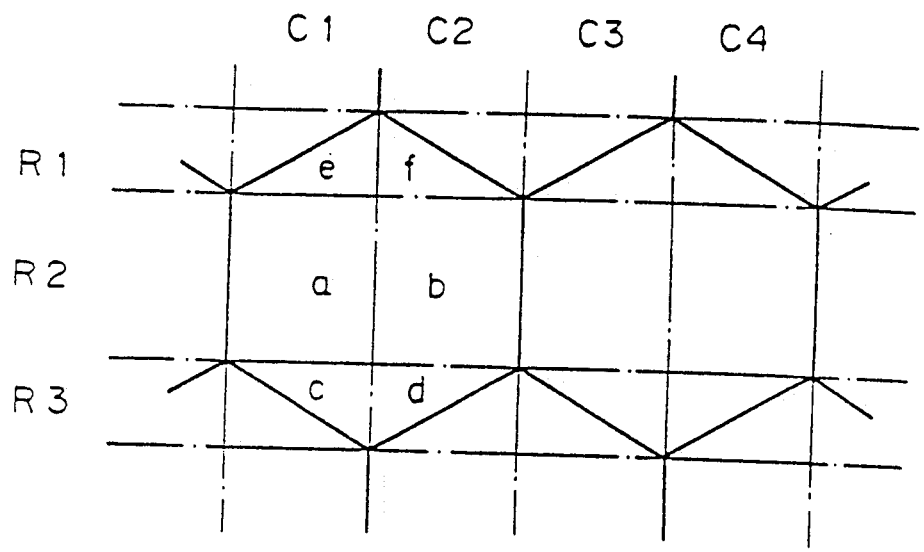
FIG. 34 is a view for explaining the method of sectioning of the discrimination areas of the signal points.

FIG. 34 is a view for explaining the method of sectioning of the discrimination areas of the signal points. The columns C1, C2, C3, ... and the rows R1, R2, R3, ... divide the area into rectangular areas a and b and triangular areas c, d, e, and f. The columns Cl, C2, C3, ... are given column numbers and the rows R1, R2, R3, ... are given row numbers. The column number generating memory 131 reads out the aforementioned column numbers using the I channel 10-bit digital demodulation signal as address signal.

Figure 35A:
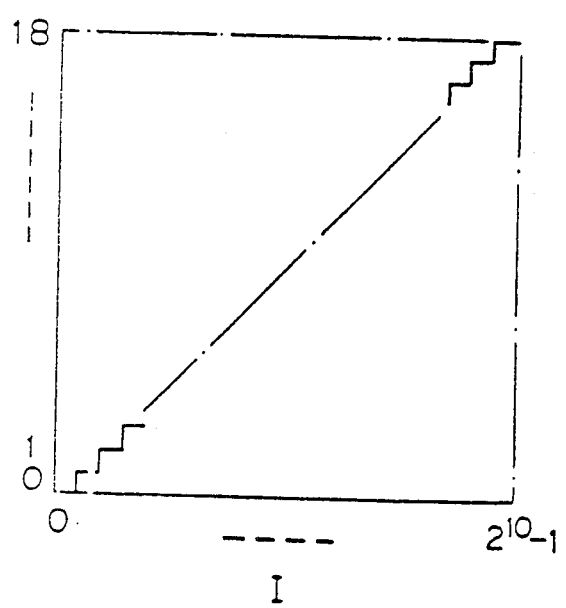
FIG. 35A and 35B are views for explaining the method of producing row numbers and column numbers.
Figure 35B:
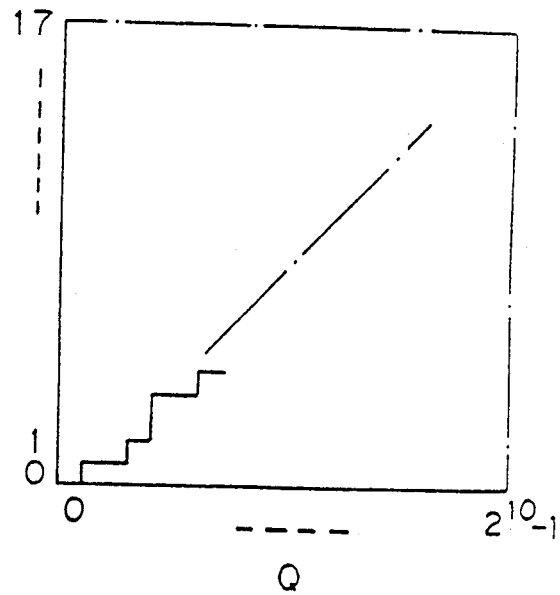

FIGS. 35A and 35B are views for explaining the method of producing row numbers and column numbers. As shown by FIG. 35A, the 0 to 18 5-bit construction column numbers are read out using the I channel digital demodulation signals 0 to $2^{10}-1$ as address signals. Further, the row number generating memory 132 reads out the afore-mentioned row numbers using the Q channel 10-bit digital demodulation signal as an address signal. As shown in FIG. 35B, the 0 to 17 5-bit construction row numbers are read out using t-he Q-channel digital demodulation signals 0 to $2^{10}-1$ as address signals.

Figure 36:
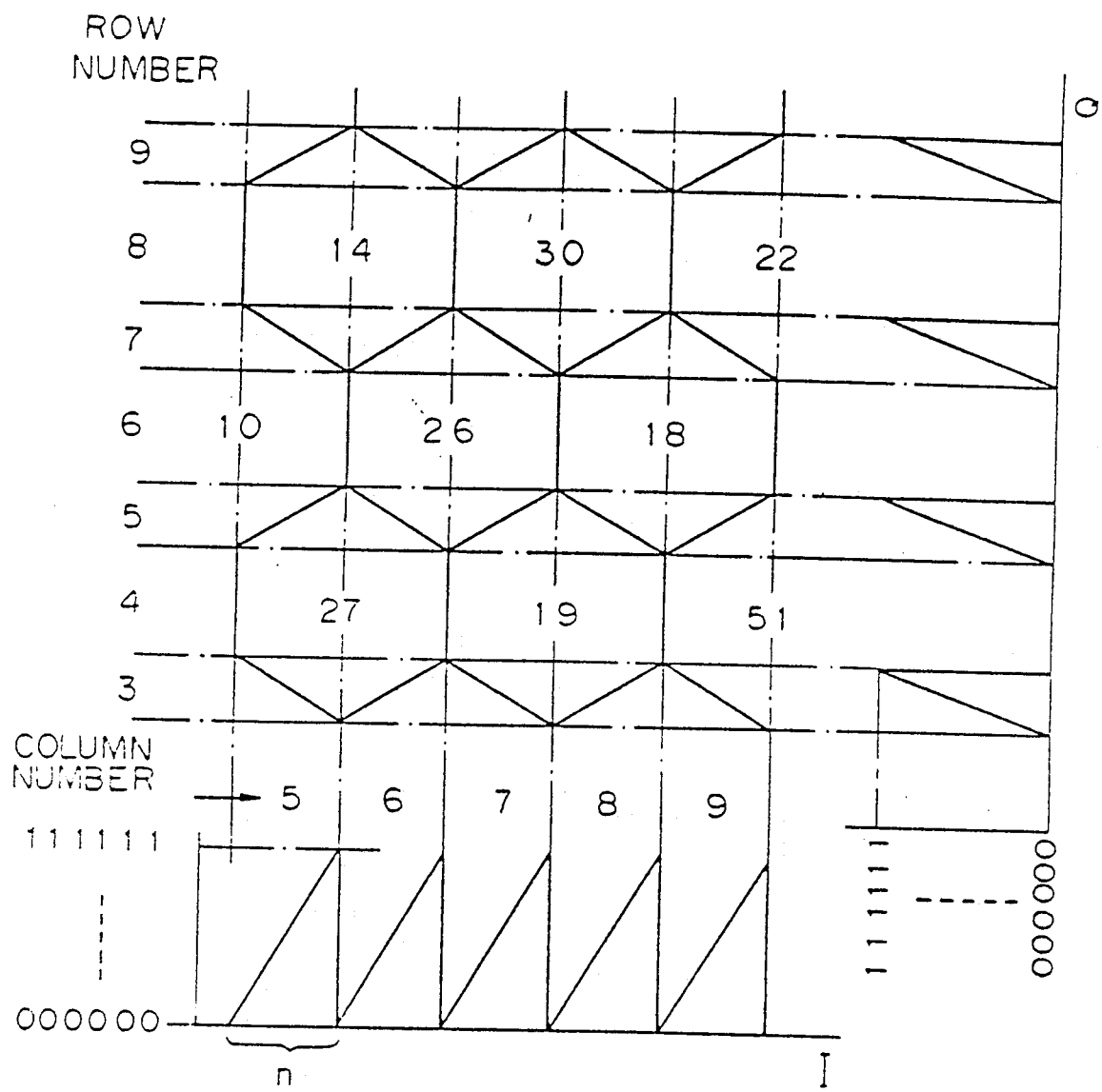
FIG. 36 is a view for explaining an example of the signal space and subaddress.

FIG. 36 is a view for explaining an example of the signal space and sub address and shows signal points at the column numbers 5 to 9 and row numbers 3 to 9. For example, the signal point 26 is in the areas of the intersection of the column numbers 6 and 7 and the row numbers 5 to 7. The rectangular areas of the intersection of the column numbers 6 and 7 and the row number 6 are all areas belonging to the signal point 26. However, the rectangular areas of the intersection of the column numbers 6 and 7 and the row numbers 5 and 7 include triangular areas of adjoining signal points, so it is necessary to determine to which signal point they belong to. For this, provision is made of the sub address generating memories 133 and 134 and the sub signal decision memory 135.

The sub address generating memory 133 provides an I channel 10-bit digital demodulation signal as an address signal and, as shown by the bottom side of FIG. 36, enables read out of a 6-bit construction sub address signal I' increased from 0 for each column. The sub address generating memory 134 provides a Q channel 10-bit digital demodulation signal as an address signal and, a shown at the right side in FIG. 36, enables readout of a 6-bit construction sub address signal Q' increased from 0 for each odd number row. That is, the sub address generating memories 133 and 134 store therein patterns which repeat every column and row.

In the case of the signal point arrangement shown in FIG. 33, there are 18 levels in the I axial direction (18 columns). To obtain a precision equal to or greater than the 10-bit precision of the prior art, $$2^{10}/18 = 56.8 \leq 2^6.$$

bits are used in the present invention.

As mentioned above, the sub address signal I' need only be a 6-bit construction. Further, since there are 17 levels (17 rows) in the Q axial direction, to obtain a precision equal to or greater than the 10-bit precision of the prior art, $$2^{10}/17 = 60.2 \leq 2^6,$$

bits are used in the present invention.

The sub address signal Q' need only be a 6-bit construction. For example, it is decided not to use the hierarchical construction ROM of the present invention, a memory capacity of 1024 kB (bytes) would be required. The reason why is that $2^{20} \times 8 = 1024$ KB. Here, the power 20 of the 2 means the sum (10+10) of the 10-bit inputs of the I channel and Q channel.

On the other hand, the four memories 131, 132, 133, and 134 are each 10-bit inputs, so 1 KB ($=2^{10}$) is required for each and the sum total of the four memories is $4 \times 1$ kB. Further, the memory 135 is 4 kB ($=2^{6+6}$), if the I channel and Q channel are each 6 bits. Further, the memory 136 is 4 kB ($=2^{5+5+2}$) if the column number is 5 bits, the row number is 5 bits, and the decision signal is 2 bits. Therefore, the total memory capacity of the ROM 21 is 12 ($=4+4+4$) kB, meaning a drastic reduction in the required capacity to about 1/100 that of the afore-mentioned 1024 KB.

Figures 37A, 37B:
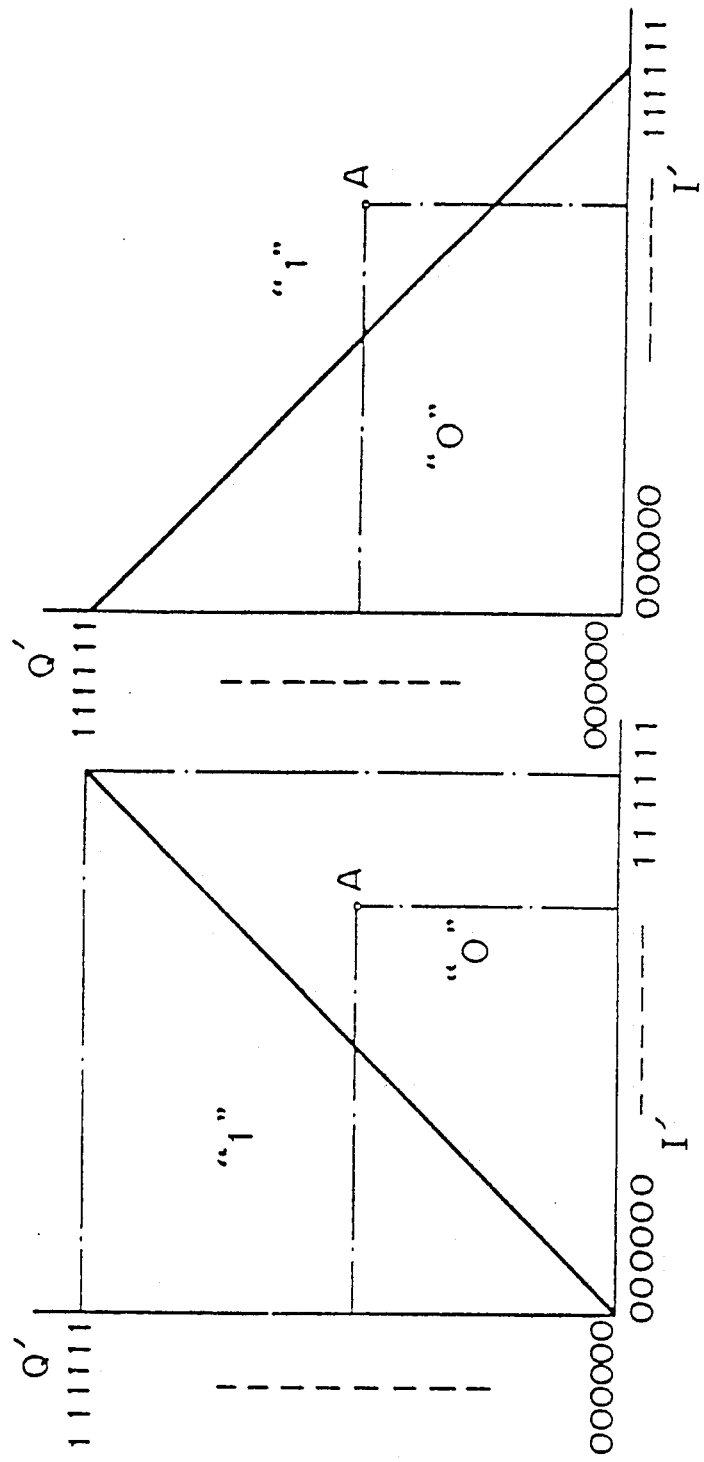
FIGS. 37A and 37B are views for explaining a first decision mode and second decision mode in a subsignal decision, memory.

FIGS. 37A and 37B are views for explaining a first decision mode and second decision mode in a sub signal decision memory. The sub signal decision memory 135 of FIG. 32, using the sub address signals I' and Q', outputs a decision signal on whether the triangular area in the rectangular area is up ("1") or down ("0"). Therefore, as shown in FIGS. 37A and 37, outputs two types of decision signals corresponding to the sub address signals I' and Q'. For example, when point A is indicated by the sub address signals I' and Q', a decision signal of "0" (see FIG. 37A) is output when the boundary line of the triangular area is right up and a decision signal of "1" (see FIG. 37B) is output when the boundary line is right down.

The signal decision memory 136 determines the signal point by the column number, row number, and decision signal. An example of the contents is shown next.

FIG. 38 is an explanatory view showing an example of the method for final decision at the signal decision memory 136. For example, the case of a column number of 6 and a row number of 6 corresponds to the area a in FIG. 31 and a signal point 26 is output. Further, the case of a column number of 6 and a row number of 5 corresponds to an area c in FIG. 31. The triangular area in the rectangular area of the intersection of the same has a right down boundary line, so the right up decision signal is not used and a right down inverted signal is used. If the decision signal in this case is "1", the triangular area in the rectangular area is at the top side, so the signal point 26 is output. If the decision signal in this case is "0", the triangular area in the rectangular area is at the bottom side, so the signal point 27 located at the bottom left of the signal point 26 is output.

As mentioned above, the signal decision memory 136 reads out data of the signal points 0 to 63 (6-bit construction) corresponding to the column numbers 0 to 18, the row numbers 0 to 17, and the decision signal.

In the afore-mentioned example, the I and Q channel digital demodulation signals serving as the input signals of the ROM 21 were 10-bit signals, so the sub address signals I' and Q' were 6-bit in construction, but the number of bits can be increased or decreased in accordance with the desired precision. For example, if the digital demodulation signals are made 8-bit in construction, then the sub address signals I' and Q' become 4-bit in construction.

Figure 39:
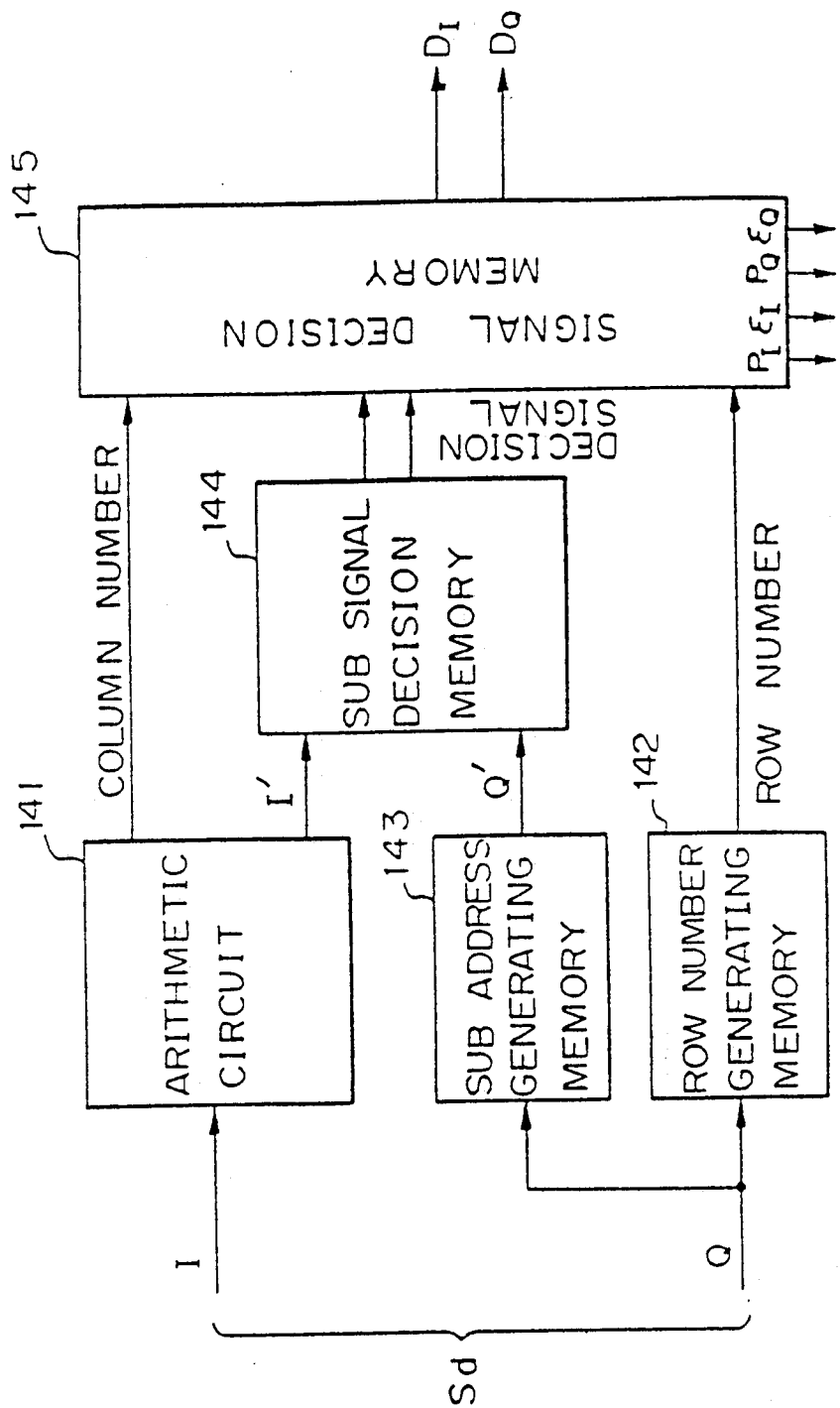
FIG. 39 is a view showing a first modification of the ROM 21 of FIG. 32.

FIG. 39 is a view showing a first modification of the ROM 21 of FIG. 32. Reference numeral 141 is an arithmetic circuit, 142 a row number generating memory, 143 a sub address generating memory, 144 a sub signal decision memory, and 145 a signal decision memory. In a first modification, the arithmetic circuit 141, row number generating memory 142, and sub address generating memory 143 comprise the discrimination means 121 in FIG. 31. Since the column numbers are given at equal intervals as shown in FIG. 36, in the arithmetic circuit 141, the digital demodulation signal I is divided by n (FIG. 36), the value of the resultant whole number is used as the column number, and the remainder is used as the sub address signal I'. In this case, for a digital demodulation signal of 10 bits, column numbers for 18 columns are obtained, so n=56.

Further, the same thing applies as with the example of FIG. 32 for the row number generating memory 142, the sub address generating memory 143, and the sub signal, decision memory 134. From the signal decision memory 145, to which is added the column number, row number, and decision signal, is obtained the signal point decision output.

The first modification involves the replacement of the column number generating memory and the sub address generating memory by an arithmetic circuit 141. When the number of bits is low, the scale of the arithmetic circuit 141 can be reduced, so this is an effective tact.

Figure 40:
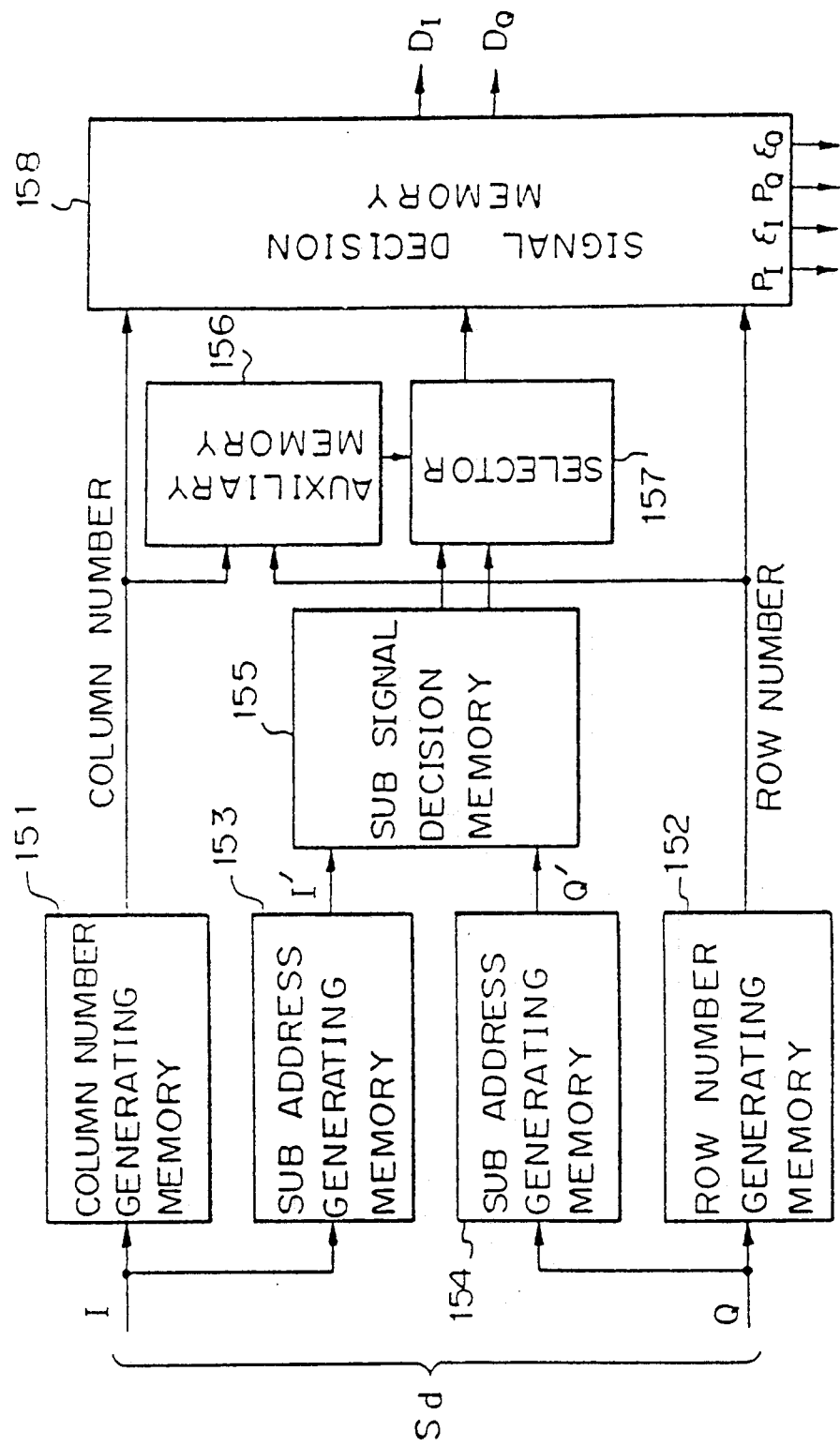
FIG. 40 is a view showing a second modification of the ROM 21 of FIG. 32.

FIG. 40 is a view showing a second modification of the ROM 21 of FIG. 32. Reference numeral 151 is a column number generating memory, 152 a row number generating memory, 153 and 154 sub address generating memories, 155 a sub signal decision memory, 156 an auxiliary memory, 157 a selector, and 158 a signal decision memory. The column number generating memory 151, row number generating memory 152, sub address generating memories 153 and 154, and sub signal decision memory 155 are the same as in the embodiment shown in FIG. 32.

The auxiliary memory 156 determines which of the right up boundary line decision signal output and right down boundary line decision signal output from the sub signal decision memory 155 to use, and controls the selector 157. For example, in FIG. 36, the case of the column number 6 and row number 3 corresponds to a right up boundary line area, so a decision signal according to FIG. 37A should be used. Therefore, in the auxiliary memory 156, use is made of the column number and row number as address signals and a signal for controlling the selector 157 is output.

The 2-bit decision signals output from the sub signal decision memory 155 are selected by the selector 157 and only one is applied to the signal decision memory 158. The 2-bit decision signals thus become a 1-bit short address signal, making possible reduction the capacity of the signal decision memory 158 by half. In this case, the capacity of the auxiliary memory 156 is smaller than one-half of the capacity of the signal decision memory 158, so the overall memory capacity can be reduced.

The digital demodulation apparatus of the present invention may be used, for example as a receiver apparatus in a microwave ratio-communications system or a satellite communication system. In particular, the present invention can be embodied in an apparatus suitable for receiving transmission signals by the honeycomb mode modulation method.

We claim:

1. A digital demodulation apparatus comprising:
   detector means for receiving and demodulating multivalue quadrature amplitude modulated signals, modulated in accordance with a honeycomb structure signal point arrangement and for providing a demodulation signal responsive to said demodulating;
   filter means for wave reshaping and demodulation signal;
   discriminator means for generating a digital demodulation signal; and
   code decision means for successively receiving said digital demodulation signal and for reproducing an original code data, said code decision means comprises
   memory means for storing code data in accordance with said honeycomb structure signal point arrangement, for storing polarity bits P and error bits $\epsilon$ of said code data, and for accessing, based on said digital demodulation signal, said out code data that corresponds to said original code data.

2. A digital demodulation apparatus according to claim 1, wherein said detector means includes means for providing said demodulation signal as an I channel signal and as a Q channel signal, and wherein said memory means includes storing means for storing said code data as data bits $D_I$ and $D_Q$ respectively corresponding to the I channel signal and Q channel signal, for storing said polarity bit P as bits $P_I$ and $P_Q$ respectively corresponding to the I and Q channel signals, and for storing said error bits $\epsilon$ are as error bits $\epsilon_I$ and $\epsilon_Q$ respectively corresponding to the I and Q channel signals.

3. A digital demodulation apparatus according to claim 2, wherein said memory means includes means for storing said code data as data corresponding to said honeycomb structure having $2^{n1}/L_I-1$ divisions along a line segment connecting a center of a hexagon and the center of a side of said hexagon parallel to and I channel signal axis, and having $2^{n2}/L_Q-1$ divisions along a line segment parallel to a Q channel signal axis, and connecting the center of said hexagon and the center of a hexagon adjoining said hexagon, where n1 and n2 are a number of bits of the I channel signal and Q channel signal, and $L_I$ and $L_Q$ respectively are a number of signal point levels along the I signal axis and along the Q signal axis.

4. A digital demodulation apparatus according to claim 2, wherein said memory means includes outputs for said data bits $D_I$ and $D_Q$, said polarity bits $P_I$ and $P_Q$, and said error bits $\epsilon_I$ and $\epsilon_Q$.

5. A digital demodulation apparatus according to claim 2, further comprising:
   automatic gain means, operatively connected to said discriminator means, for holding a level of said demodulation signal to a predetermined fixed value in response to a detection signal; and
   level detector means for receiving the polarity bits $P_I$ and $P_Q$ and error bits $\epsilon_I$ and $\epsilon_Q$ for performing an exclusive OR with these bits to detect a magnitude of the level of said demodulation signal, and for providing a detection signal responsive to said exclusive OR so as to vary a gain of the automatic gain means in accordance with the magnitude of the level detected.

6. A digital demodulation apparatus according to claim 5, wherein said level detector means includes:
   signal point ROM means for determining an error rate of said demodulation signal, for selecting specific signal points in accordance with said error rate, said specific signal points being signal points corresponding to a maximum level and a minimum level of said demodulation signal.

7. A digital demodulation apparatus according to claim 6, wherein a first number of said specific signal points corresponds to the maximum level and a second number of said specific signal points corresponds to the minimum level said first and second numbers being almost equal.

8. A digital demodulation apparatus according to claim 2, further comprising:
   equalizer means, operatively connected between said filter means and said code decision means, for equalizing said digital demodulation signal in accordance with equalization control parameters determined by said polarity bits $P_I$ and $P_Q$ and said error bits $\epsilon_I$ and $\epsilon_Q$.

9. A digital demodulation apparatus according to claim 2, further comprising DC offset controller means for holding a level of the demodulation signal to a predetermined DC level; and
   offset detector means for receiving the error bits $\epsilon_I$ and $\epsilon_Q$ and for detecting a shift direction of a DC level of said demodulation signal, so that said DC offset controller means adjusts the DC level in accordance with the shift direction.

10. A digital demodulation apparatus according to claim 9, wherein said offset level detector means includes:
    signal point ROM means for determining an error rate of said demodulation signal, for selecting specific signal points in accordance with said error rate, and for detecting a shift direction of the DC level, said specific signal points being signal points corresponding to a maximum level and a minimum level of said demodulation signal.

11. A digital demodulation apparatus according to claim 10, wherein a first number of said specific signal points corresponds to the maximum level and a second number of said specific signal points corresponds to the minimum level said first and second numbers being almost equal.

12. A digital demodulation apparatus according to claim 2, wherein said detector means comprises:
    I channel signal and W channel signal mixer means for demodulating said multivalue quadrature amplitude modulated signals based on a carrier for;
    oscillator means for generating said carrier;
    phase detector means for controlling a phase of said carrier to be shifted in accordance with an exclusive OR of at least two of said polarity bit $P_I$, said error bit $\epsilon_Q$, said polarity bit $P_Q$ and said error bit $\epsilon_I$.

13. A digital demodulation apparatus according to claim 2, wherein said storing means comprises:
    a plurality of ROM's connected to receive a series of said digital demodulation signals and and to provide, in parallel, said data $D_I$, $D_q$, polarity bits $P_I$, $P_Q$, and error bits $\epsilon_I$, $\epsilon_Q$ corresponding to said digital demodulation signals.

14. A digital demodulation apparatus according to claim 2, wherein said memory means comprises:

discrimination means for storing said code data in accordance with rows and columns so as to divide said honeycomb structure into rectangular first and second areas and triangular first, second, third, and fourth areas for each code data and for determining a row number and a column number based on said digital demodulation signal;

said signal decision memory for determining are at the top or bottom of a rectangular area comprising an intersection of said row and column including a particular code data and for providing as an output at least one of an up signal and a down signal respectively based on said top and bottom determination; and signal decision memory means for providing said data $D_I$, $D_Q$, said polarity bits $P_I$, $P_Q$ and said error bits $\epsilon_I$, $\epsilon_Q$ based on said row number and said column number and on said output from said sub signal decision memory.

15. A digital demodulation apparatus according to claim 14, wherein said discrimination means comprises:

column number generating memory means for generating the column number based on said I channel signal;

I channel side sub address generating memory means for generating an address based on said I channel signal;

row number generating memory means for generating the row number based on said Q channel signal; and Q channel side sub address generating memory means for generating another address based on said Q channel signal.

16. A digital demodulation apparatus according to claim 14, wherein said discrimination means comprises:

arithmetic circuit means for producing, by arithmetic, the column number and said address signal based on said I channel signal;

row number generating memory means for generating the row number based on said Q channel signal; and Q channel side sub address generating memory means for generating another address based on said Q channel signal.

17. A digital demodulation apparatus according to claim 14, further comprising:

selector for selecting one of the up or down signals; and auxiliary memory means for receiving the column number and the row number and for controlling said selector means.

18. A digital demodulation apparatus according to claim 1, wherein said memory comprises one of a ROM or RAM.

* * * * *